(12) United States Patent
Ebara

(10) Patent No.: US 8,468,869 B2
(45) Date of Patent: Jun. 25, 2013

(54) METHOD FOR CALIBRATING PARAMETER OF ARTICULATED COORDINATE MEASURING APPARATUS

(75) Inventor: Fumikazu Ebara, Saitama (JP)

(73) Assignee: Kosaka Laboratory Ltd., Tokyo (JP)

( * ) Notice: Subject to any disclaimer, the term of this patent is extended or adjusted under 35 U.S.C. 154(b) by 595 days.

(21) Appl. No.: 12/666,877

(22) PCT Filed: May 26, 2008

(86) PCT No.: PCT/JP2008/001308
§ 371 (c)(1),
(2), (4) Date: Mar. 30, 2010

(87) PCT Pub. No.: WO2009/001504
PCT Pub. Date: Dec. 31, 2008

(65) Prior Publication Data
US 2010/0206040 A1    Aug. 19, 2010

(30) Foreign Application Priority Data
Jun. 28, 2007    (JP) .................................. 2007-169973

(51) Int. Cl.
*G01B 3/30*    (2006.01)
*G01B 1/00*    (2006.01)

(52) U.S. Cl.
USPC ............................................. 73/1.79; 33/502

(58) Field of Classification Search
USPC ......... 73/1.79, 1.89, 1.81, 1.01, 1.75; 33/503, 33/502
See application file for complete search history.

(56) References Cited

U.S. PATENT DOCUMENTS

| 5,430,948 A * | 7/1995 | Vander Wal, III | 33/502 |
| 6,493,956 B1 * | 12/2002 | Matsuda | 33/502 |
| 6,748,790 B2 * | 6/2004 | Abbe | 73/1.79 |
| 2004/0187332 A1 * | 9/2004 | Kikuchi et al. | 33/503 |
| 2009/0271996 A1 * | 11/2009 | Ferrari et al. | 33/502 |

FOREIGN PATENT DOCUMENTS

| JP | 62-028808 | 2/1987 |
| JP | 01-321183 | 12/1989 |
| JP | 2004-264135 | 9/2004 |
| JP | 2005-157784 | 6/2005 |
| WO | WO 93/11915 | 6/1993 |

OTHER PUBLICATIONS

PCT Notification of Transmittal of Copies of Translation of the International Preliminary Report on Patentability, mailed Feb. 4, 2010, in International Application No. PCT/JP2008/001308 (5 pages).
"Evaluation of Measurement data—Guide to the expression of uncertainty in measurement" [GUM 1995 with minor corrections] Joint Committee for Guides in Metrology (BIPM, IEC, IFCC, ILAC, ISO, IUPAC, IUPAC and OIML) (2008).

* cited by examiner

*Primary Examiner* — Daniel Larkin
*Assistant Examiner* — Jamar Ray
(74) *Attorney, Agent, or Firm* — Finnegan, Henderson, Farabow, Garrett & Dunner, LLP

(57) ABSTRACT

A method of calibrating a group of parameters of an articulated coordinate measuring apparatus includes the use of primary and secondary standard units. These standard units each include one or more calibration reference portions, and the group of parameters include primary and secondary calibration parameters. Space coordinates of each reference portion of the primary standard unit is measured at a plurality of arm positions of the apparatus, and calibration is performed for the primary calibration parameters based on the measurements. Space coordinates of the reference portions of secondary standard unit is then measured and parameter calibration is performed for the secondary calibration parameters based on these measurements.

7 Claims, 19 Drawing Sheets

METHOD FOR CALIBRATING PARAMETER OF ARTICULATED COORDINATE MEASURING APPARATUS

TECHNICAL FIELD

The present invention relates to a parameter calibration method of an articulated coordinate measuring apparatus in which a user operates an articulated measuring arm to bring a probe mounted to one end of the measuring arm close to a measurement point on an object to be measured, and measures a space coordinate of the measurement point.

BACKGROUND ART

A conventionally known articulated measuring apparatus that measures a complicated three-dimensional shape of an object to be measured includes a flexible articulated measuring arm. For example, Japanese Patent Laid-Open No. 2004-264135 (pp. 8-14, FIG. 1) discloses such an articulated measuring apparatus. With the conventional articulated measuring apparatus, a user moves the measuring arm to bring a probe mounted to a tip of the measuring arm close to an arbitrary measurement point on the object to be measured and measure a position or a size of the object to be measured. The articulated coordinate measuring apparatus includes therein an angle sensor (for example, a rotary encoder) that measures a rotation angle of each joint of the measuring arm. Then, a space coordinate of a tip of the probe is calculated based on the rotation angle of each joint of the measuring arm and a design length between joints or between a joint and a probe. Specifically, a calculation process is performed of converting a parameter indicating the rotation angle obtained from the angle sensor and a parameter indicating the length between joints or between a joint and a probe into space coordinates, that is, of converting a coordinate system of the measuring arm into a coordinate system of the object to be measured.

When performing measurement using the above-described articulated measuring apparatus, the user sometimes operates the measuring arm with a strong force. For example, the user sometimes strongly pulls, bends, or shortens the measuring arm. When stress is thus applied to the measuring arm, errors may occur in parameters read from each sensor of the measuring arm.

The articulated measuring apparatus requires measurement of a complicated three-dimensional shape with high accuracy. However, the errors occurring in each parameter of the measuring arm of the articulated measuring apparatus as described above make difficult the measurement with high accuracy. Then, conventionally, a method has been proposed of calibrating each parameter of a measuring arm using an artifact (standard unit) to reduce parameter errors. For example, Japanese Patent Laid-Open No. 2005-157784 (pp. 12-26) discloses such a method.

However, in the conventional method, all parameters of the measuring arm are calibrated. The articulated measuring arm has many joints, and thus many parameters are to be calibrated. Calibration work of parameters of a measuring arm is essential preparation work for measurement with high accuracy, but calibration of all the parameters takes much labor and time. It is certain that sufficient time needs to be taken to perform calibration work of all the parameters in factory shipment, apparatus installation, or the like. However, a user who daily performs measurement needs to daily perform calibration work of parameters, and reductions in labor and time for daily calibration work is desired.

DISCLOSURE OF THE INVENTION

Problems to be Solved by the Invention

The present invention is achieved under the above-described background. The present invention has an object to provide a parameter calibration method of an articulated coordinate measuring apparatus that can reduce labor and time for calibration work of parameters of a measuring arm.

Means for Solving the Problems

An aspect of the present invention provides a parameter calibration method of an articulated coordinate measuring apparatus for operating an articulated measuring arm to bring a probe mounted to one end of the measuring arm close to a measurement point on an object to be measured and measure a space coordinate of the measurement point, wherein the method includes: placing a primary standard unit including a plurality of primary calibration reference portions in an operation space of the measuring arm; operating the measuring arm to bring the probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; performing a parameter calibration process of the primary calibration parameters based on measurement results of the primary calibration reference portions; placing a secondary standard unit including a secondary calibration reference portion smaller in number than the primary calibration reference portions in the operation space of the measuring arm; operating the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and performing a parameter calibration process of the secondary calibration parameters based on measurement results of the secondary calibration reference portion.

Another aspect of the present invention provides a parameter calibration guide apparatus that guides a user to perform parameter calibration of an articulated coordinate measuring apparatus, wherein the guide for the user includes: a guide to place a primary standard unit including a plurality of primary calibration reference portions in an operation space of a measuring arm; a guide to operate the measuring arm to bring a probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; a guide to cause a computer to execute a parameter calibration process of the primary calibration parameters based on measurement results of the primary calibration reference portions; a guide to place a secondary standard unit including a secondary calibration reference portion smaller in number than the primary calibration reference portions in the operation space of the measuring arm; a guide to operate the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and a guide to cause the computer to execute a parameter calibration process of the secondary calibration parameters based on measurement results of the secondary calibration reference portion.

A further aspect of the present invention provides a parameter calibration guide program that guides a user to perform parameter calibration of an articulated coordinate measuring apparatus, wherein the program causes a computer to execute the steps of: guiding the user to place a primary standard unit including a plurality of primary calibration reference portions in an operation space of a measuring arm; guiding the user to operate the measuring arm to bring a probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; performing a parameter calibration process of the primary calibration parameters based on measurement results of the primary calibration reference portions; guiding the user to place a secondary standard unit including a secondary calibration reference portion smaller in number than the primary calibration reference portions in the operation space of the measuring arm; guiding the user to operate the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and performing a parameter calibration process of the secondary calibration parameters based on measurement results of the secondary calibration reference portion.

The present invention also includes other aspects as described below. Thus, the Disclosure of the Invention is intended to provide a part of the aspects of the present invention, and not intended to limit the scope of the invention herein described and claimed.

Figure 1:
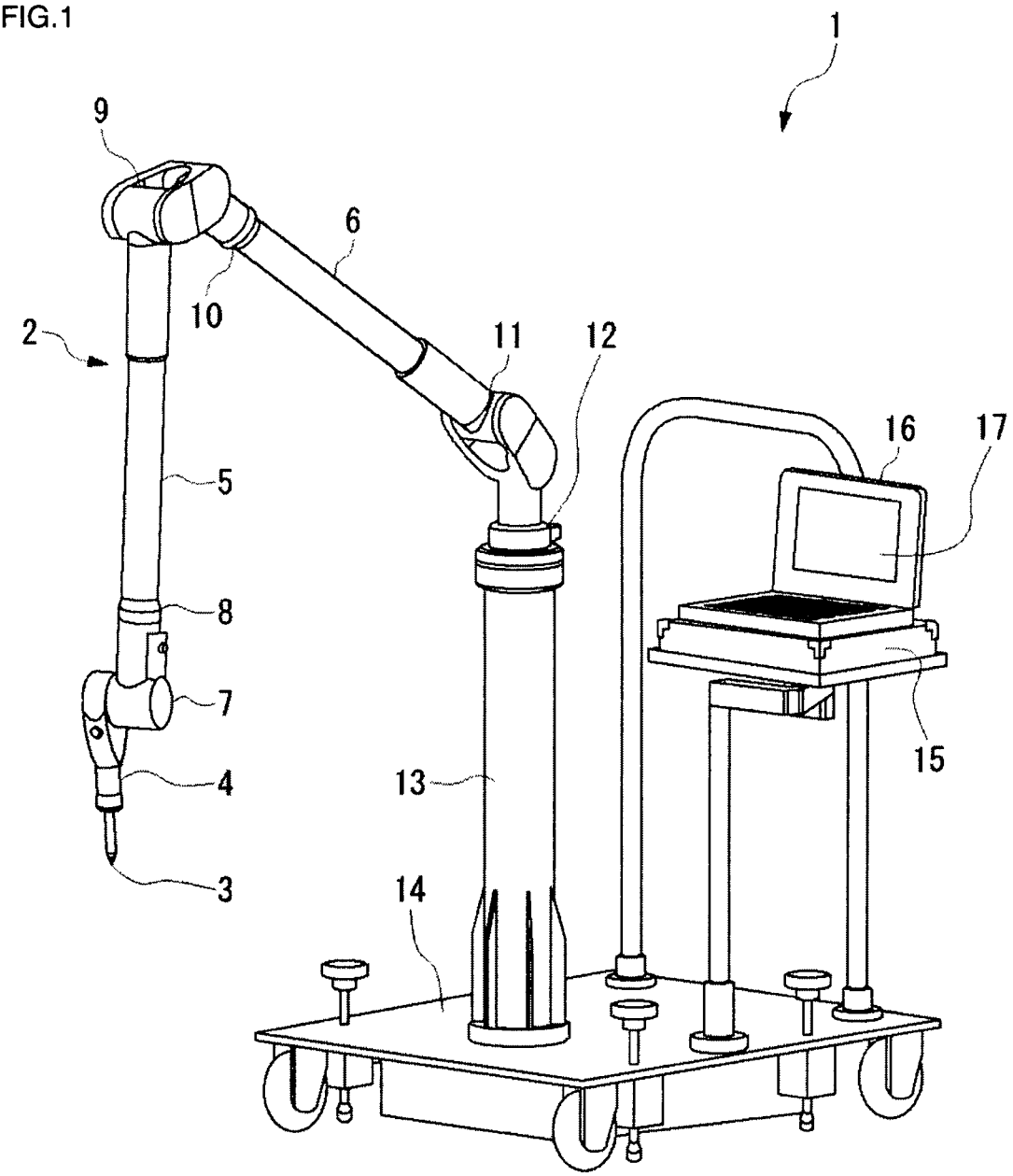
FIG. 1 shows an appearance of an articulated coordinate measuring apparatus according to an embodiment.

DESCRIPTION OF SYMBOLS 1 articulated coordinate measuring apparatus
2 measuring arm
3 probe
3A tapered probe
3B ball probe
4 probe mounting portion
5 first link
6 second link
7 No. 1 joint
8 No. 2 joint
9 No. 3 joint
10 No. 4 joint
11 No. 5 joint
12 No. 6 joint
15 dedicated processor
16 computer
17 display
20 standard unit
20A standard unit for tapered probe
20B standard unit for tapered probe
20C standard unit for tapered probe
20D standard unit for ball probe
20E standard unit for ball probe
22 small ball
24 recess

BEST MODE FOR CARRYING OUT THE INVENTION

Now, detailed descriptions of the present invention will be described. The detailed descriptions below and the accompanying drawings do not limit the invention. Instead, the scope of the invention is defined by the appended claims.

The present invention provides a parameter calibration method of an articulated coordinate measuring apparatus for operating an articulated measuring arm to bring a probe mounted to one end of the measuring arm close to a measurement point on an object to be measured and measure a space coordinate of the measurement point, wherein the method includes: placing a primary standard unit including a plurality of primary calibration reference portions in an operation space of the measuring arm; operating the measuring arm to bring the probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; performing a parameter calibration process of the primary calibration parameters based on measurement results of the primary calibration reference portions; placing a secondary standard unit including a secondary calibration reference portion smaller in number than the primary calibration reference portions in the operation space of the measuring arm; operating the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and performing a parameter calibration process of the secondary calibration parameters based on measurement results of the secondary calibration reference portion.

In the parameter calibration of the measuring arm, a parameter calibration process is first performed of the parameters (primary calibration parameters), among all the parameters (a group of parameters) to be calibrated, having such a characteristic that parameter errors increase more than a predetermined reference when a predetermined period passes, and a parameter calibration process is then performed of the parameters (secondary calibration parameters), among the primary calibration parameters, having such a characteristic that parameter errors increase more than a predetermined reference when a shorter period than the predetermined period passes. Thus, the calibration processes of only the parameters (primary calibration parameters and secondary calibration parameters) that change with time need to be performed, and there is no need for performing calibration processes of all the parameters. Thus, for a user who performs parameter calibration work daily (for example, every day, every week, or every month), labor and time for the calibration work of the parameters of the measuring arm can be reduced. For the secondary calibration parameters that greatly change with time (for example, parameters having large daily errors), one time parameter calibration as conventional is sometimes insufficient. In this case, parameter calibration of such parameters is performed again. Thus, calibration is performed focusing on parameters that require calibration, thereby allowing efficient parameter calibration. Specifically, parameter calibration weighted according to changes with time can be performed in view of the characteristic of each parameter. In this case, the number of secondary calibration reference portions measured in the secondary calibration is smaller than that of the primary calibration reference portions measured in the primary calibration, and the number of the arm positions in measurement of the secondary calibration reference portions is also smaller than that of the arm positions in measurement of the primary calibration reference portions. Thus, secondary calibration work is easier than primary calibration work, and thus requires less labor and time than the primary calibration work.

In the parameter calibration method of an articulated coordinate measuring apparatus of the present invention, the articulated measuring arm may include a probe mounting member having one end to which the probe is mounted, a first link connected to the probe mounting member, a first joint that provides a bending operation of the probe mounting member with respect to the first link, and a second joint that provides a twisting operation of the probe mounting member with respect to the first link, and when the second joint is rotated in a twisting direction to twist the first link with the probe being brought close to the primary calibration reference portions or the secondary calibration reference portion in a state where the probe mounting portion is vertically placed, space coordinates of the primary calibration reference portions or the secondary calibration reference portion may be measured at a plurality of arm positions.

The plurality of arm positions correspond to parameters of the first joint of the measuring arm. The first joint of the measuring arm is often subjected to stress in measurement or the like, and parameters of a rotation angle of the first joint greatly change with time (for example, parameters having large daily errors). Calibration can be performed focusing on such parameters to minimize parameter errors.

In the parameter calibration method of an articulated coordinate measuring apparatus of the present invention, the articulated measuring arm may include a probe mounting member having one end to which the probe is mounted, a first link connected to the probe mounting member, a first joint that provides a bending operation of the probe mounting member with respect to the first link, and a second joint that provides a twisting operation of the probe mounting member with respect to the first link, and when the first joint is rotated in a bending direction to rotate the probe mounting member along a vertical plane with the probe being brought close to the primary calibration reference portions or the secondary calibration reference portion from a state where the probe mounting portion is horizontally placed, space coordinates of the primary calibration reference portions or the secondary calibration reference portion may be measured at a plurality of arm positions.

The plurality of arm positions correspond to parameters of the first joint of the measuring arm. The first joint of the measuring arm is often subjected to stress in measurement or the like, parameters of a rotation angle of the first joint greatly change with time (for example, parameters having large daily errors). Calibration can be performed focusing on such parameters to minimize parameter errors.

In the parameter calibration method of an articulated coordinate measuring apparatus of the present invention, the articulated measuring arm may include a probe mounting member having one end to which the probe is mounted, a first link connected to the probe mounting member, a first joint that provides a bending operation of the probe mounting member with respect to the first link, and a second joint that provides a twisting operation of the probe mounting member with respect to the first link, and when the second joint is rotated in a twisting direction to rotate the probe mounting member along a horizontal plane with the probe being brought close to the primary calibration reference portions or the secondary calibration reference portion from a state where the probe mounting portion is horizontally placed, space coordinates of the primary calibration reference portions or the secondary calibration reference portion may be measured at a plurality of arm positions.

The plurality of arm positions correspond to parameters of the first and second joints of the measuring arm. The first and second joints of the measuring arm are often subjected to stress in measurement or the like, parameters of rotation angles of the first and second joints greatly change with time (for example, parameters having large daily errors). Calibration can be performed focusing on such parameters to minimize parameter errors.

In the parameter calibration method of an articulated coordinate measuring apparatus of the present invention, the articulated measuring arm may include a probe mounting member having one end to which the probe is mounted, a first link connected to the probe mounting member, a second link connected to the first link and mounted to a support member, a fourth joint that provides a twisting operation of the first link with respect to the second link, a fifth joint that provides a bending operation of the second link with respect to the support member, and a sixth joint that provides a twisting operation of the second link with respect to the support member, and when the fourth joint and the sixth joint are rotated in a twisting direction to horizontally tilt the first link with the probe being brought close to the primary calibration reference portions or the secondary calibration reference portion in a state where the probe mounting portion is vertically placed, space coordinates of the primary calibration reference portions or the secondary calibration reference portion may be measured at a plurality of arm positions.

The plurality of arm positions correspond to parameters of the fourth, fifth and sixth joints of the measuring arm. The fourth, fifth and sixth joints of the measuring arm are often subjected to stress in measurement or the like, parameters of rotation angles of the fourth, fifth and sixth joints greatly change with time (for example, parameters having large daily errors). Calibration can be performed focusing on such parameters to minimize parameter errors.

In the parameter calibration method of an articulated coordinate measuring apparatus of the present invention, the parameter calibration process may perform a parameter estimation process by a least squares method using a matrix with a P-matrix and an R-matrix as a design matrix, the P-matrix including a component of a partial differential value when a coordinate value obtained by measurement is partially differentiated by the primary calibration parameters or the secondary calibration parameters, and the R-matrix including a component of a partial differential value when a coordinate value obtained by measurement is partially differentiated by a vector component of a coordinate transformation vector that converts a coordinate system of the measuring arm into a coordinate system of the standard unit.

The coordinate transformation vector that converts a coordinate system of the measuring arm into a coordinate system of the standard unit is used, and the least squares method using the design matrix is used, thereby allowing estimation of a correct parameter value of the measuring arm.

The present invention provides a parameter calibration guide apparatus that guides a user to perform parameter calibration of an articulated coordinate measuring apparatus, wherein the guide for the user includes: a guide to place a primary standard unit including a plurality of primary calibration reference portions in an operation space of a measuring arm; a guide to operate the measuring arm to bring a probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; a guide to cause a computer to execute a parameter calibration process of the primary calibration parameters based on measurement results of the primary calibration reference portions; a guide to place a secondary standard unit including a secondary calibration reference portion smaller in number than the primary calibration reference portions in the operation space of the measuring arm; a guide to operate the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and a guide to cause the computer to execute a parameter calibration process of the secondary calibration parameters based on measurement results of the secondary calibration reference portion.

The user advances the calibration work according to the guides provided by the guide apparatus, and thus can easily perform the above-described parameter calibration method along working steps. This can reduce labor and time for calibration work of the parameters of the measuring arm.

The present invention provides a parameter calibration guide program that guides a user to perform parameter calibration of an articulated coordinate measuring apparatus, wherein the program causes a computer to execute the steps of: guiding the user to place a primary standard unit including a plurality of primary calibration reference portions in an operation space of a measuring arm; guiding the user to operate the measuring arm to bring a probe close to the primary calibration reference portions and measure a space coordinate of each of the primary calibration reference portions at a plurality of arm positions, the plurality of arm positions corresponding to primary calibration parameters, among a group of parameters to be calibrated, having such a characteristic that parameter errors increase more than a predetermined reference when a predetermined period passes; performing a parameter calibration process of the primary calibration parameters based on measurement results of the primary calibration reference portions; guiding the user to place a secondary standard unit including a secondary calibration reference portion smaller in number than the primary calibration reference portions in the operation space of the measuring arm; guiding the user to operate the measuring arm to bring the probe close to the secondary calibration reference portion and measure a space coordinate of the secondary calibration reference portion at a smaller number of arm positions than the plurality of arm positions, the small number of arm positions corresponding to secondary calibration parameters, among the primary calibration parameters, having such a characteristic that parameter errors increase more than a predetermined reference when a shorter period than the predetermined period passes; and performing a parameter calibration process of the secondary calibration parameters based on measurement results of the secondary calibration reference portion.

The user advances the calibration work according to the guides provided by the guide program, and thus can easily perform the above-described parameter calibration method along working steps. This can reduce labor and time for calibration work of the parameters of the measuring arm.

According to the parameter calibration method of an articulated coordinate measuring apparatus, labor and time for calibration work of the parameters of the measuring arm can be reduced. Also, parameter calibration weighted according to changes with time can be performed in view of the characteristics of the parameters of the measuring arm.

Now, the parameter calibration method of an articulated coordinate measuring apparatus according to an embodiment of the present invention will be described with reference to the drawings. In this embodiment, a case is exemplified where a user performs a parameter calibration method using a guide program stored in an HDD or a memory of a parameter calibration guide apparatus.

FIG. 1 shows an appearance of an example of an articulated coordinate measuring apparatus according to this embodiment. As shown in FIG. 1, a measuring arm 2 of an articulated coordinate measuring apparatus 1 includes a probe mounting portion 4 (also referred to as a first arm) to which a probe 3 is mounted, a first link 5 (also referred to as a second arm) connected to the probe mounting portion 4, a second link 6 (also referred to as a third arm) connected to the first link 5, and six No. 1 to No. 6 joints 7 to 12.

Figure 2:
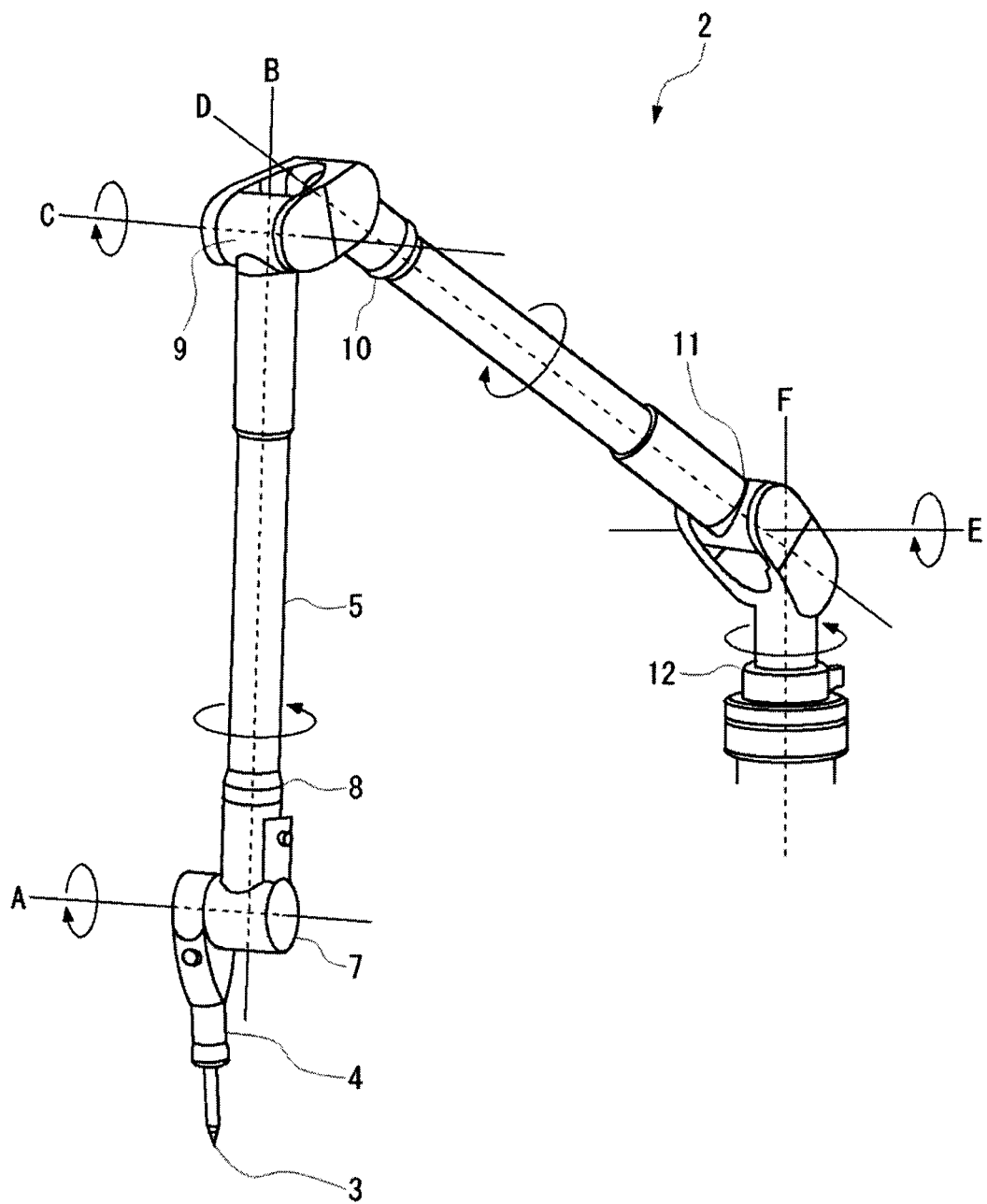
FIG. 2 shows a rotating direction of each joint of a measuring arm.

FIG. 2 illustrates a rotating direction of each joint of the measuring arm 2. As shown in FIG. 2, the No. 1 joint 7 (also referred to as a wrist joint) provides a bending operation (rotation around an axis A in FIG. 2) of the probe mounting portion 4 with respect to the first link 5, and the No. 2 joint 8 provides a twisting operation (rotation around an axis B in FIG. 2) of the probe mounting portion 4 with respect to the first link 5. The No. 3 joint 9 (also referred to as an elbow joint) provides a bending operation (rotation around an axis C in FIG. 2) of the first link 5 with respect to the second link 6, and the No. 4 joint 10 provides a twisting operation (rotation around an axis D in FIG. 2) of the first link 5 with respect to the second link 6. The No. 5 joint 11 (also referred to as a shoulder joint) provides a bending operation (rotation around an axis E in FIG. 2) of the second link 6 with respect to a column 13, and the No. 6 joint 12 provides a twisting operation (rotation around an axis F in FIG. 2) of the second link 6 with respect to the column 13.

The No. 1 joint 7 corresponds to a first joint in the present invention, and the No. 2 joint 8 corresponds to a second joint in the present invention. The No. 4 joint 10 corresponds to a fourth joint in the present invention, and the No. 6 joint 12 corresponds to a sixth joint in the present invention.

Each of the No. 1 to No. 6 joints of the measuring arm 2 includes therein an angle sensor (not shown) such as a rotary encoder, which detects a rotation angle around each axis. The twisting operations of the No. 2, No. 4 and No. 6 joints 8, 10 and 12 may be limited in rotation angle or may be endless rotation.

As shown in FIG. 1, the column 13 is installed on a movable mount 14, and a dedicated processor 15 and a computer 16 are provided on the mount 14. The dedicated processor 15 is connected to the rotary encoder of each joint with or without wires so that angle information of each rotary encoder is input to the dedicated processor 15. The dedicated processor 15 can calculate an (X, Y, Z) coordinate of a tip of the probe 3 based on the input angle of each joint and a fixed positional relationship of each member (including a length of the link or the probe or the like). The computer 16 can run and execute various application programs, and space coordinate values calculated by the dedicated processor 15 are input to the application programs.

A guide program for parameter calibration is stored in an HDD or a memory (not shown) of the computer 16. When the user executes the guide program, a guide screen described later is displayed on a display 17 of the computer 16. Herein, the computer 16 corresponds to a parameter calibration guide apparatus of the present invention.

Various types of probes 3 can be mounted to the probe mounting portion 4 of the measuring arm 2. The various types of probes 3 include a contact probe a tip of which is brought into contact with an object to be measured to calculate a space coordinate of a tip of the probe, or a noncontact probe a tip of which is not brought into contact with an object to be measured but that uses an infrared laser or the like to calculate a space coordinate of the object to be measured. Specifically, various types of probes 3 can be replaceably mounted to the probe mounting portion 4 of the measuring arm 2.

Figure 4:
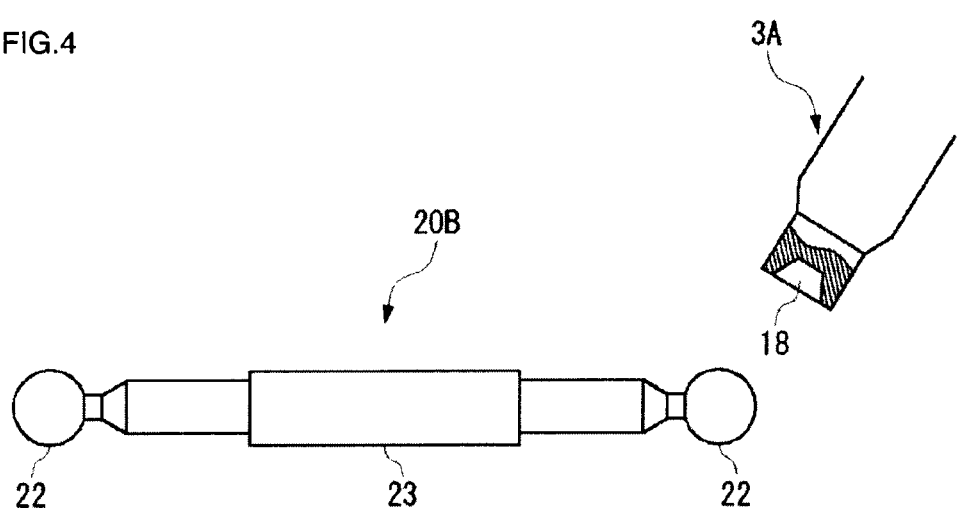
FIG. 4 shows another example of a standard unit for a tapered probe.

In parameter calibration of the measuring arm 2, for example, a tapered probe 3A is used a tip of which having a tapered recess 18 is brought into contact with a spherical surface of an object to be measured to calculate a coordinate of the center of a sphere (see FIG. 4). Alternatively, a ball probe 3B is used a tip of which having a ball-shaped protrusion 19 is brought into contact with a recess in an object to be measured to calculate a coordinate of the center of a sphere (see FIG. 7).

In parameter calibration of the measuring arm 2, various types of standard units 20 (also referred to as gauges) are used according to the types of the probe 3.

Figure 3:
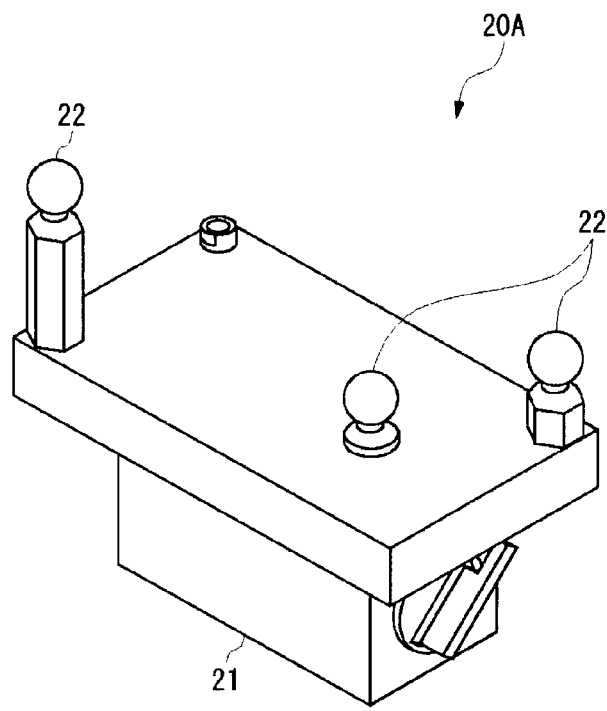
FIG. 3 shows an example of a standard unit for a tapered probe.

FIG. 3 shows an example of a standard unit for a tapered probe. In a standard unit 20A (also referred to as a dedicated gauge for a tapered probe) in FIG. 3, three small balls 22 are provided on a base 21 with different heights. Diameters of the three small balls 22 and distances between the centers thereof are previously measured by a precise measuring apparatus (not shown). Information on the diameters of the small balls 22 and the distances between the centers thereof is used in parameter calibration of the measuring arm 2.

FIG. 4 shows another example of a standard unit for a tapered probe. In a standard unit 20B (also referred to as a bar gauge for a tapered probe in FIG. 4, two small balls 22 are provided on opposite ends of a bar 23. Diameters of the two small balls 22 and a distance between the centers thereof are previously measured by a precise measuring apparatus (not shown). Information on the diameters of the small balls 22 and the distance between the centers thereof is used in parameter calibration of the measuring arm 2.

Figure 5:
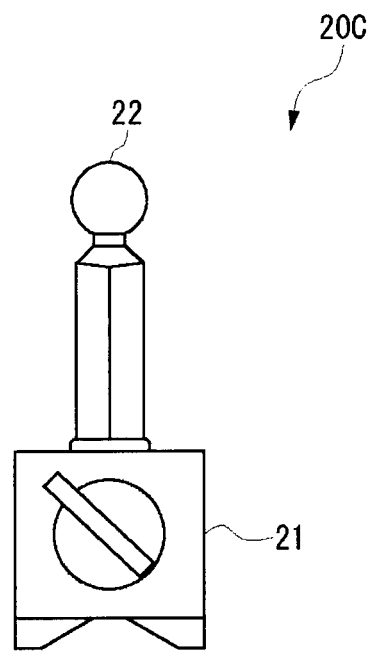
FIG. 5 shows a further example of a standard unit for a tapered probe.

FIG. 5 shows a further example of a standard unit for a tapered probe. In a standard unit 20C (also referred to as a simple gauge for a tapered probe) in FIG. 5, one small ball 22 is provided on a base 21. A diameter of the small ball 22 is previously measured by a precise measuring apparatus (not shown). Information on the diameter of the small ball 22 is used in parameter calibration of the measuring arm 2.

In this embodiment, two small balls 22 are measured for primary calibration, and one small ball 22 is measured for secondary calibration. Thus, the two small balls 22 to be measured for the primary calibration herein correspond to primary calibration reference portions in the present invention, and one small ball 22 to be measured for the secondary calibration corresponds to a secondary calibration reference portion in the present invention.

The standard unit 20 including the primary calibration reference portions (two small balls 22 for the primary calibration) corresponds to a primary standard unit in the present invention, and the standard unit 20 including the secondary calibration reference portion (one small ball 22 for the secondary calibration) corresponds to a secondary standard unit in the present invention. Thus, for example, when the standard unit 20A in FIG. 3 corresponds to the primary standard unit in the present invention, the standard unit 20B or 20C in FIG. 4 or 5 corresponds to the secondary standard unit in the present invention. When the standard unit 20B in FIG. 4 corresponds to the primary standard unit in the present invention, the standard unit 20C in FIG. 5 corresponds to the secondary standard unit in the present invention.

When one standard unit 20 includes both the primary calibration reference portions and the secondary calibration reference portion in the present invention, the same standard unit 20 may be used as the primary standard unit and the secondary standard unit in the present invention. For example, in the standard unit 20A in FIG. 3, two small balls 22 among three small balls 22 may be used as primary calibration reference portions in the present invention, and one remaining small ball 22 may be used as a secondary calibration reference portion in the present invention. Then, it can be said that the standard unit 20A in FIG. 3 corresponds to both the primary standard unit and the secondary standard unit in the present invention. In this case, there is no need for a working process for placing the secondary standard unit, thereby further reducing labor and time for parameter calibration work of the measuring arm 2.

Figure 6:
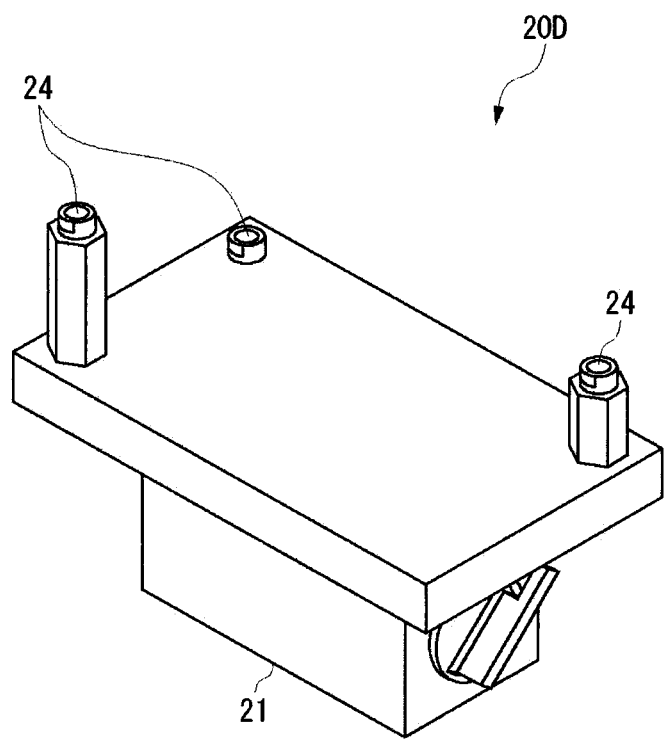
FIG. 6 shows an example of a standard unit for a ball probe.

FIG. 6 shows an example of a standard unit for a ball probe. In a standard unit 20D (also referred to as a dedicated gauge for a ball probe) in FIG. 6, three recesses 24 (also referred to as V-shaped seats) are provided on a base 21 with different heights. Coordinates of the central points of the three recesses 24 and distances between the centers thereof are previously measured by a precise measuring apparatus (not shown). Information on the coordinates of the central points of the recesses 24 and the distances between the centers thereof is used in parameter calibration of the measuring arm 2.

Figure 7:
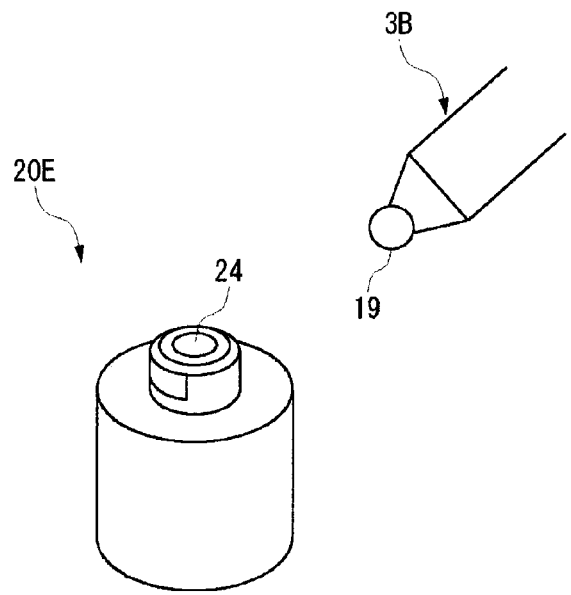
FIG. 7 shows another example of a standard unit for a ball probe.

FIG. 7 shows another example of a standard unit for a ball probe. In a standard unit 20E (also referred to as a simple gauge for a ball probe) in FIG. 7, one recess 24 (V-shaped seat) is provided on a base 21. A coordinate of the central point of the recess 24 is previously measured by a precise measuring apparatus (not shown). Information on the coordinate of the central point of the recess 24 is used in parameter calibration of the measuring arm 2.

In this case, two recesses 24 (V-shaped seats) are measured for primary calibration, and one recess 24 (V-shaped seat) is measured for secondary calibration. Thus, the two recesses 24 to be measured for the primary calibration herein correspond to primary calibration reference portions in the present invention, and one recess 24 to be measured for the secondary calibration corresponds to a secondary calibration reference portion in the present invention.

Thus, as described above, the standard unit 20D in FIG. 6 corresponds to a primary standard unit in the present invention, and the standard unit 20E in FIG. 7 corresponds to a secondary standard unit in the present invention. The standard unit 20D in FIG. 6 may correspond to both the primary standard unit and the secondary standard unit in the present invention like the standard unit 20A in FIG. 3.

The dedicated processor 15 performs a calibration process of the parameters of the measuring arm 2 based on measurement results of the primary calibration reference portions (for example, two small balls 22) or the secondary calibration reference portion (for example, one small ball 22). In this embodiment, a coordinate transformation vector that converts a coordinate system of the measuring arm 2 into a coordinate system of the standard unit is used, and a least squares method using a design matrix is used, thereby allowing estimation of a correct parameter value of the measuring arm 2.

More specifically, a parameter estimation process by the least squares method is performed using a matrix with a P-matrix and an R-matrix as a design matrix. Herein, the P-matrix includes a component of a partial differential value when a coordinate value obtained by measurement of the primary calibration reference portions or the secondary calibration reference portion is partially differentiated by primary calibration parameters or secondary calibration parameters. Also, the R-matrix includes a component of a partial differential value when a coordinate value obtained by measurement of the primary calibration reference portions or the secondary calibration reference portion is partially differentiated by a vector component of a coordinate transformation vector that converts a coordinate system of the measuring arm 2 into a coordinate system of the standard unit 20. The basic theory of the parameter calibration process used in this embodiment is described in detail in Patent Document 2 (Japanese Patent Laid-Open No. 2005-157782).

The parameter calibration method of this embodiment has a feature in performing the calibration process of a part of the parameters rather than the calibration process of all of the parameters. More specifically, one feature is first primarily performing the calibration process of the primary calibration parameters as a part of all the parameters, and then secondarily performing the calibration process of the secondary calibration parameters as a part of the primary calibration parameters. Then, the primary calibration parameters and the secondary calibration parameters will be described.

Figure 8:
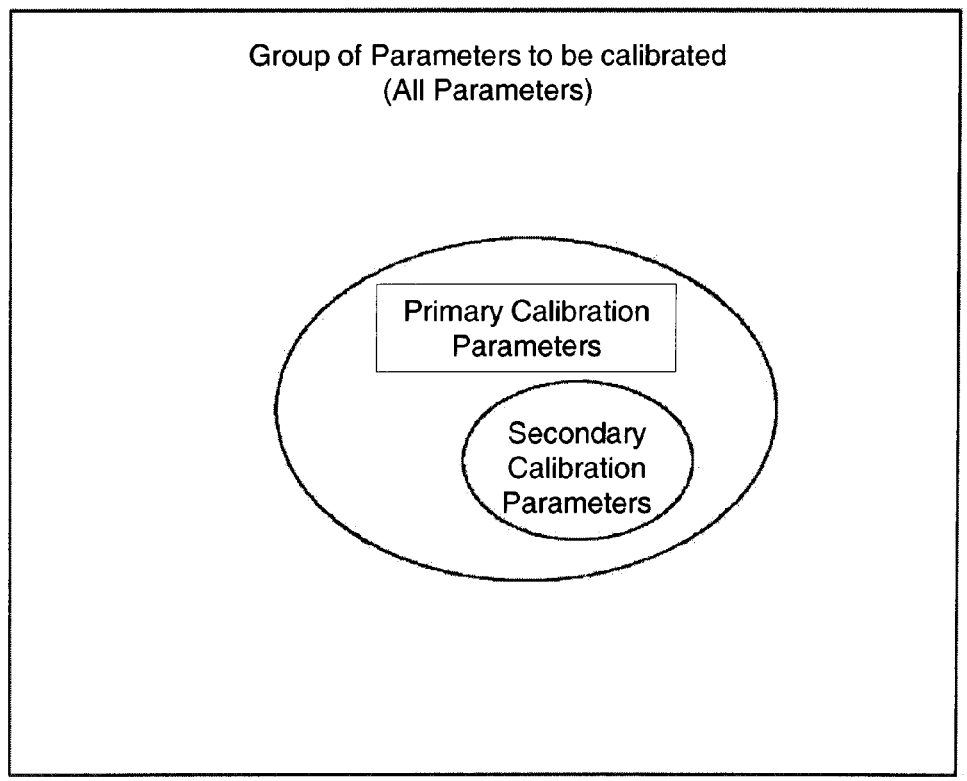
FIG. 8 illustrates primary calibration parameters and secondary calibration parameters.

FIG. 8 conceptually shows the primary calibration parameters and the secondary calibration parameters. As shown in FIG. 8, a group of parameters to be calibrated (all the parameters) include parameters (primary calibration parameters) having such a characteristic that parameter errors increase more than a predetermined reference when a predetermined period passes, and the primary calibration parameters include parameters (secondary calibration parameters) having such a characteristic that parameter errors increase more than a predetermined reference when a shorter period than the predetermined period passes. The predetermined reference is a reference of "uncertainty", and for example, an index for a measurement error defined by "Guide to the expression of uncertainty in measurement" compiled by international organizations engaged in measurement in 1993.

The predetermined period is, for example, one month or one week, and a shorter period than the predetermined period is, for example, one day. Specifically, parameters in which errors are caused by stress due to user's use when the predetermined period (for example, one month or one week) passes correspond to the primary calibration parameters, and parameters in which errors are caused even when a shorter period than the predetermined period (for example, one day) passes correspond to the secondary calibration parameters. Specifically, the secondary calibration parameters more greatly change with time than the primary calibration parameters.

Specifically, the No. 1 joint 7 or the No. 2 joint 8 of the measuring arm 2 is often subjected to stress in measurement or the like, and parameters of a rotation angle of the No. 1 joint 7 or the No. 2 joint 8 are secondary calibration parameters that greatly change with time (for example, parameters having daily errors).

Also, the No. 4 joint 10 or the No. 6 joint 12 of the measuring arm 2 is often subjected to stress in measurement or the like, and parameters of a rotation angle of the No. 4 joint 10 or the No. 6 joint 12 are secondary calibration parameters that greatly change with time (for example, parameters having daily errors).

In this case, the No. 3 joint 9 or the No. 5 joint 11 of the measuring arm 2 is sometimes subjected to stress in measurement or the like, and parameters of a rotation angle of the No. 3 joint 9 or the No. 5 joint 11 are primary calibration parameters that change with time (for example, parameters having monthly or weekly errors).

The parameter calibration method of the articulated coordinate measuring apparatus 1 configured as described above will be described with reference to FIGS. 9 to 22. An operation will be herein described when a user performs parameter calibration of the measuring arm 2 according to guides displayed on the display 17 of the computer 16. When the user executes a guide program of the computer 16, the display 17 of the computer 16 displays guide screens as shown in FIGS. 9 to 22. In the examples of the guide screens shown in FIGS. 9 to 22, guide drawings for describing arm positions are displayed, and guide text for describing the contents of work may be displayed together with the guide drawings.

(Calibration of Primary Calibration Parameter)

First, an operation will be described for performing calibration of the primary calibration parameters of the measuring arm 2 in the articulated coordinate measuring apparatus 1 of this embodiment. A case of performing parameter calibration using the standard unit 20A in FIG. 3 is exemplified.

When a guide program for calibration of the primary calibration parameters is executed, first, the display 17 of the computer 16 displays a guide screen (not shown) in which the standard unit 20A is placed in a predetermined position in an operation space of the measuring arm 2. At this time, the display 17 may also display guide text saying, for example, "Place the standard unit on the surface plate. Place the standard unit so that the balls a and b are arranged left and right when viewing the measuring apparatus from the front. The ball c is not used." The user places the standard unit 20A in the predetermined position in the operation space of the measuring arm 2 according to the guide displayed on the display 17.

Then, the display 17 of the computer 16 displays a guide in which a space coordinate of the small ball 22 of the standard unit 20A is measured at a plurality of arm positions as shown in FIGS. 9 to 22.

Figure 9:
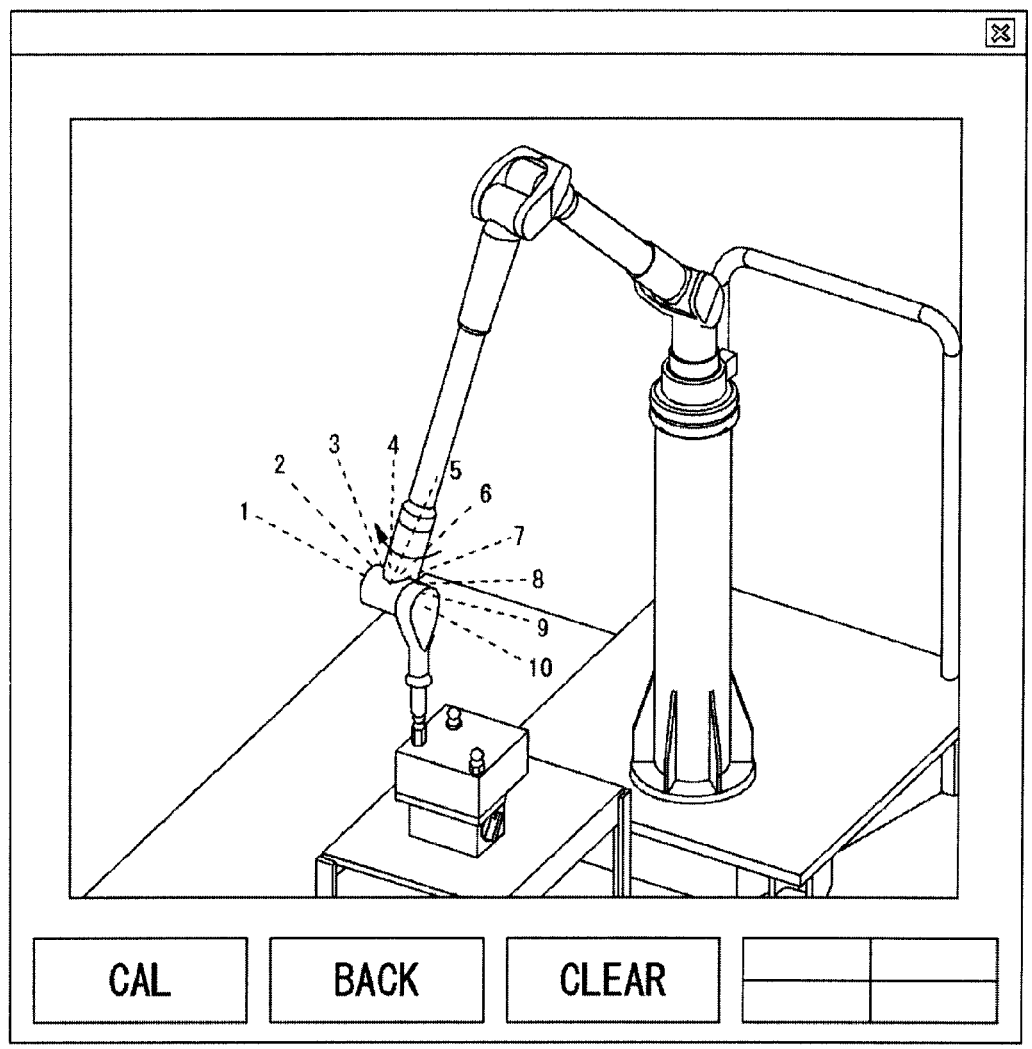
FIG. 9 shows an example of a guide screen in measurement of a reference portion (ball a) at an arm position A.

In this embodiment, a space coordinate of the ball a is first measured at a plurality of arm positions. In this case, the display 17 of the computer 16 displays a guide screen in which the measuring arm 2 is operated to measure a space coordinate of the ball a at a predetermined arm position A as shown in FIG. 9. At this time, the display 17 may also display guide text saying, for example, "Confirm that the No. 2 joint and the No. 4 joint are at the initial positions, set the No. 1 joint substantially to the initial position, and raise the probe mounting portion. While rotating only the No. 2 joint 180°, measure the ball a at ten points at arm positions 1 to 10 at regular intervals. Note that the probe mounting portion is always raised." The user operates the measuring arm 2 to measure the space coordinate of the ball a at ten points at the arm position A (arm positions 1 to 10) according to the guide displayed on the display 17.

Figure 10:
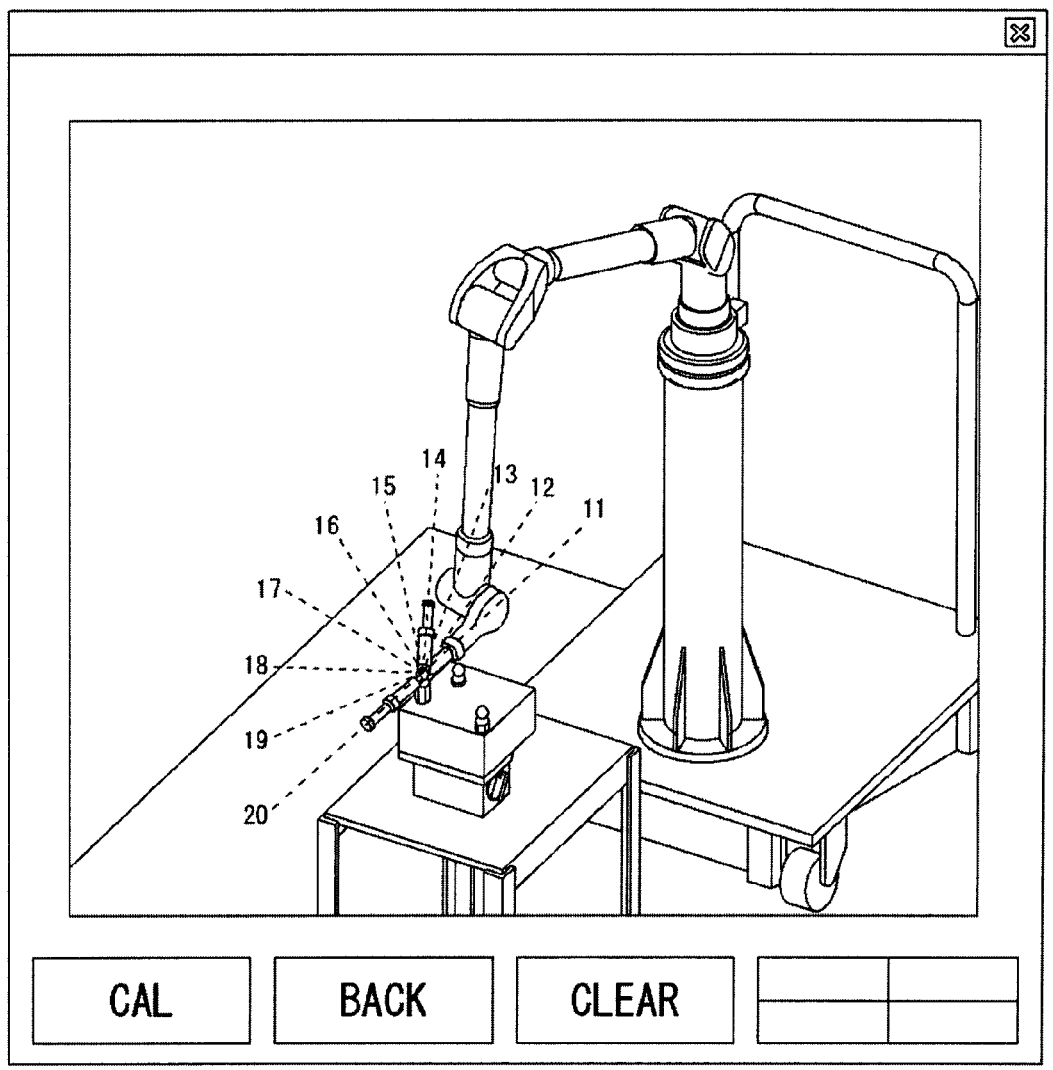
FIG. 10 shows an example of a guide screen in measurement of the reference portion (ball a) at an arm position B.

Then, the display 17 of the computer 16 displays a guide screen in which the measuring arm 2 is operated to measure a space coordinate of the ball a at a predetermined arm position B as shown in FIG. 10. At this time, the display 17 may also display guide text saying, for example, "Confirm that the No. 2 joint and the No. 4 joint are substantially at the initial positions, rotate the No. 1 joint 90°, make the probe mounting portion horizontal from the measuring apparatus side, and bring the probe into contact with the ball a. While rotating the No. 1 joint 180°, vertically rotate the probe mounting portion, and measure the ball a at ten points at arm positions 11 to 20 at regular intervals. Note that the probe mounting portion is level at the arm positions 11 and 20." The user operates the measuring arm 2 to measure the space coordinate of the ball a at ten points at the arm position B (arm positions 11 to 20) according to the guide displayed on the display 17.

Figure 11:
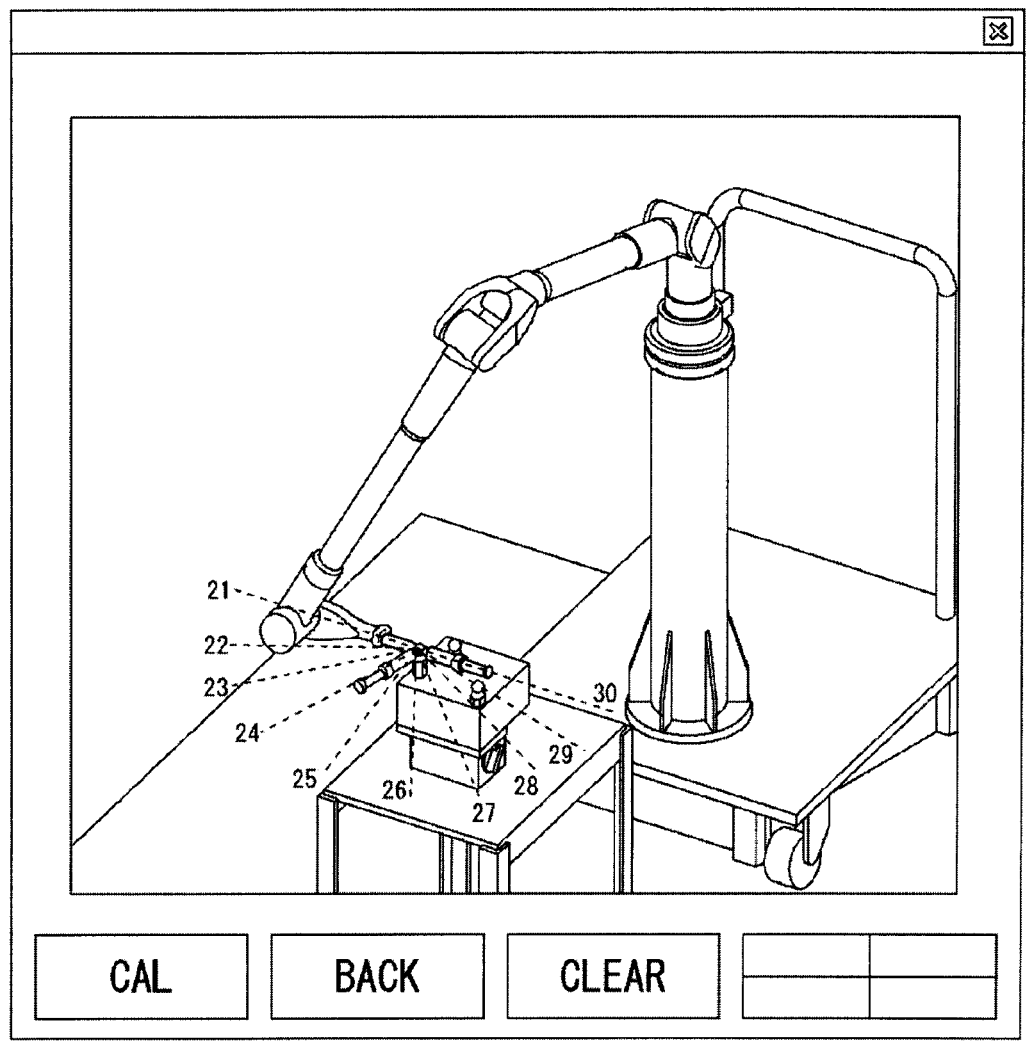
FIG. 11 shows an example of a guide screen in measurement of the reference portion (ball a) at an arm position C.

Then, the display 17 of the computer 16 displays a guide screen in which the measuring arm 2 is operated to measure a space coordinate of the ball a at a predetermined arm position C as shown in FIG. 11. At this time, the display 17 may also display guide text saying, for example, "Confirm that the No. 4 joint is substantially at the initial position, and rotate the No. 2 joint 90° clockwise. Rotate the No. 1 joint 90°, make the probe mounting portion horizontal, and bring the probe into contact with the ball a from the left side. While rotating the No. 2 joint 180°, laterally rotate the probe mounting portion, and measure the ball a at ten points at arm positions 21 to 30 at regular intervals. Note that the probe comes into contact with the ball a from the right side at the arm position 30." The user operates the measuring arm 2 to measure the space coordinate of the ball a at ten points at the arm position C (arm positions 21 to 30) according to the guide displayed on the display 17.

Figure 12:
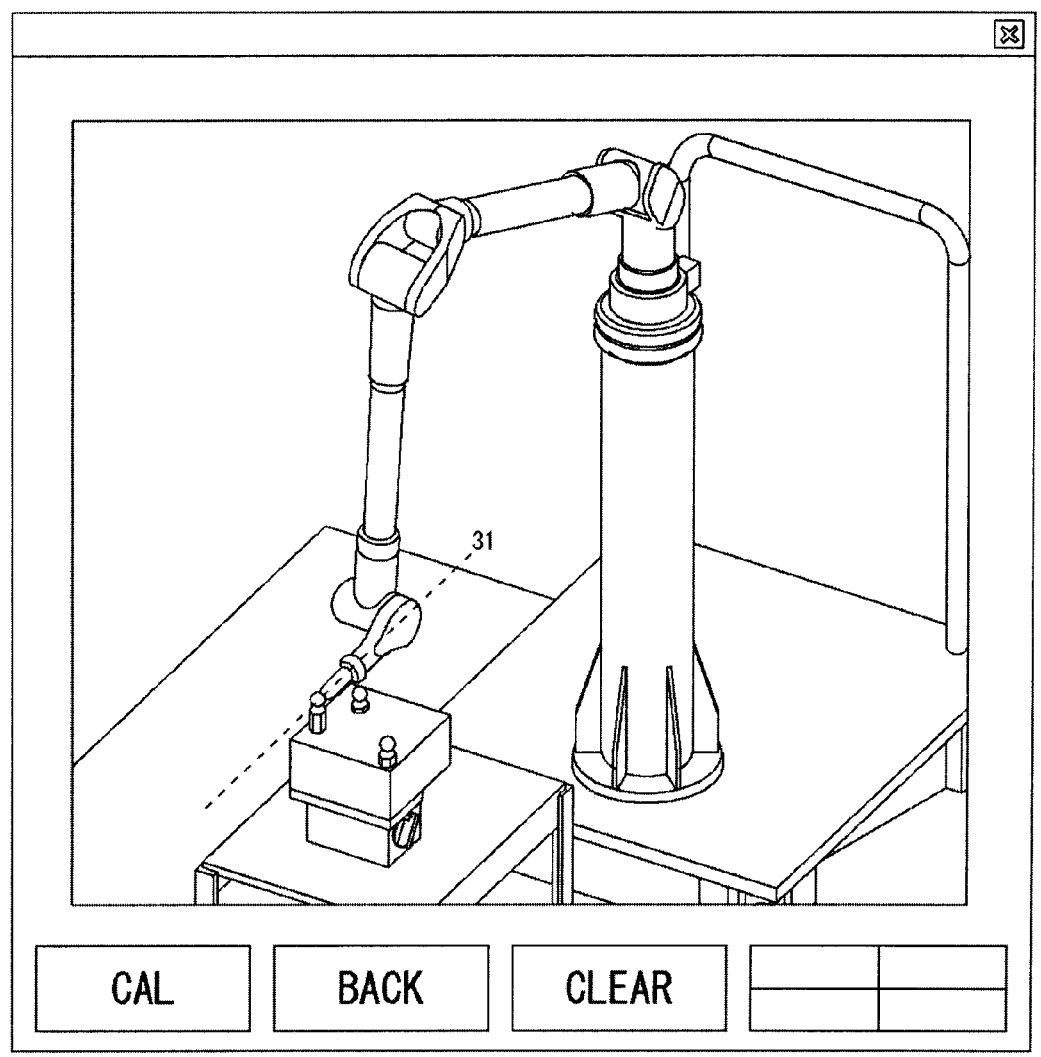
FIG. 12 shows an example of a guide screen in measurement of the reference portion (ball a) at an arm position D.

Then, the display 17 of the computer 16 displays a guide screen in which the measuring arm 2 is operated to measure a space coordinate of the ball a at a predetermined arm position D as shown in FIG. 12. At this time, the display 17 may also display guide text saying, for example, "Set the No. 2 joint and the No. 4 joint substantially to the initial positions, and rotate the No. 1 joint 90°. Make the probe mounting portion horizontal, bring the probe into contact with the ball a from the measuring apparatus side, and measure the ball a at one point at the arm position 31." The user operates the measuring arm 2 to measure the space coordinate of the ball a at one point at the arm position D (arm position 31) according to the guide displayed on the display 17.

Figure 13:
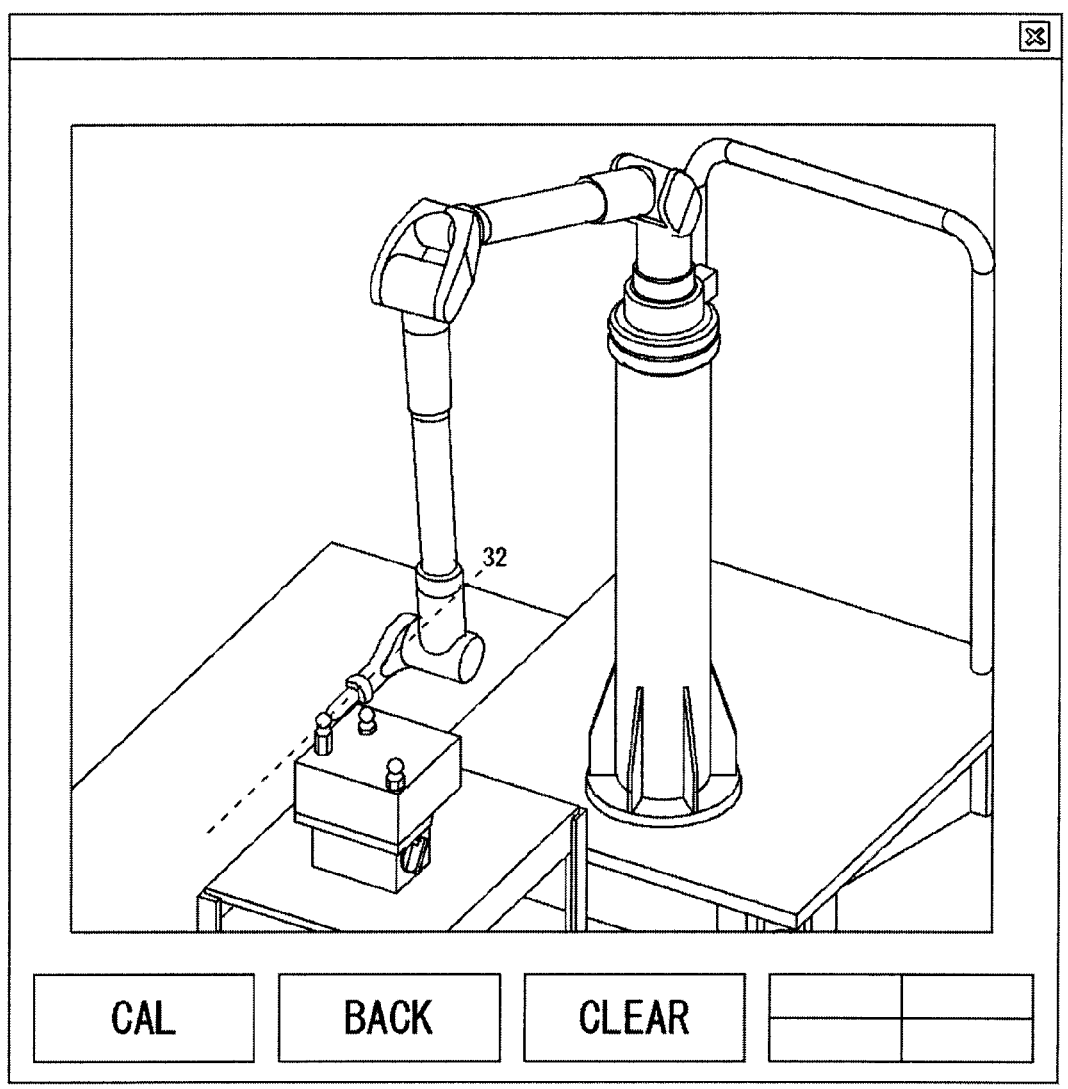
FIG. 13 shows an example of a guide screen in measurement of the reference portion (ball a) at an arm position E.

Then, the display 17 of the computer 16 displays a guide screen in which the measuring arm 2 is operated to measure a space coordinate of the ball a at a predetermined arm position E as shown in FIG. 13. At this time, the display 17 may also display guide text saying, for example, "Rotate the No. 2 joint 180° from the arm positions 31. Set the No. 4 joint substantially to the initial position, and rotate the No. 1 joint 90°. Make the probe mounting portion horizontal, bring the probe into contact with the ball a from the measuring apparatus side, and measure the ball a at one point at the arm position 32." The user operates the measuring arm 2 to measure the space coordinate of the ball a at one point at the arm position E (arm position 32) according to the guide displayed on the display 17.

Figure 14:
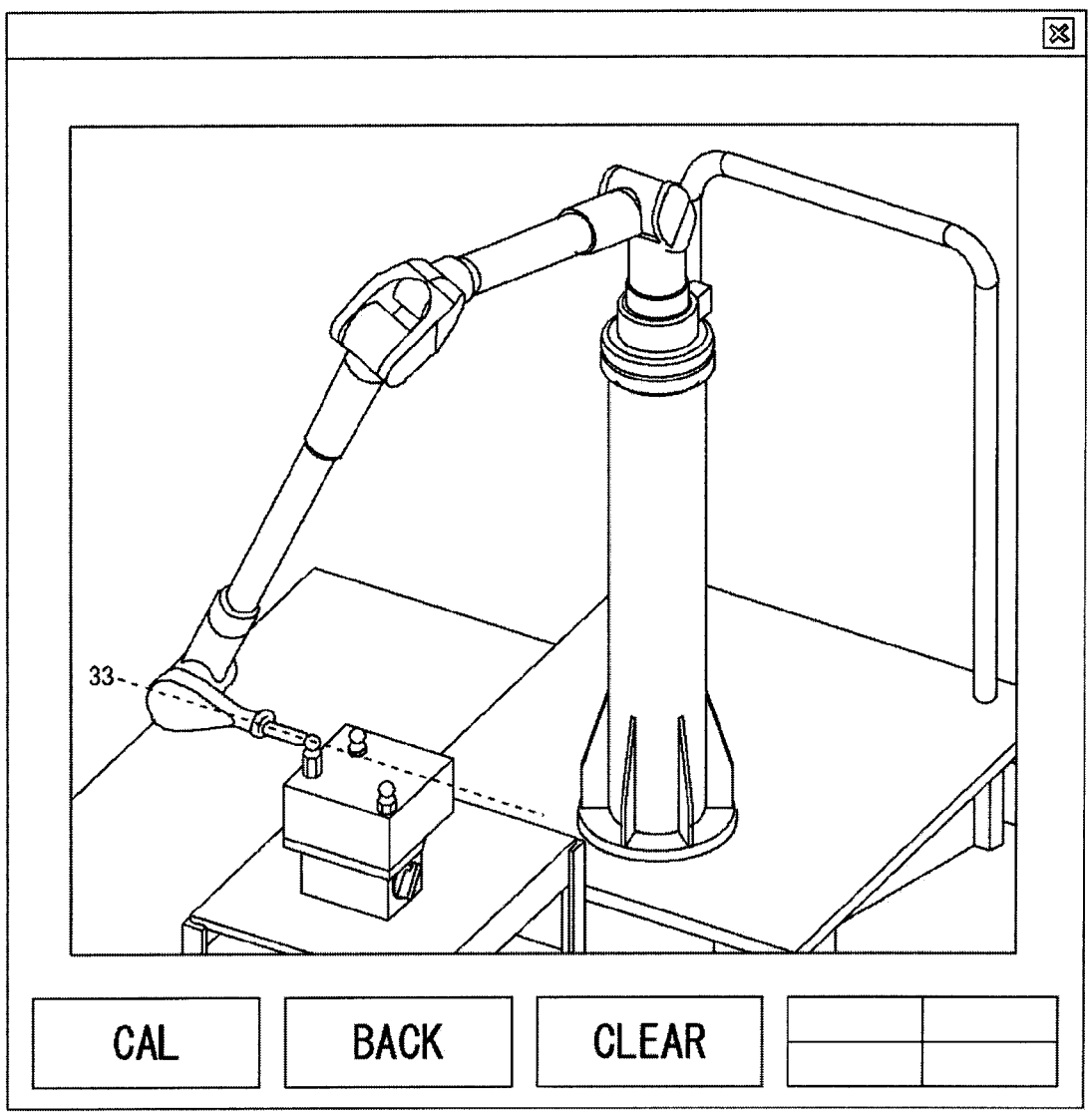
FIG. 14 shows an example of a guide screen in measurement of the reference portion (ball a) at an arm position F.

Then, the display 17 of the computer 16 displays a guide screen in which the measuring arm 2 is operated to measure a space coordinate of the ball a at a predetermined arm position F as shown in FIG. 14. At this time, the display 17 may also display guide text saying, for example, "Confirm that the No. 4 joint is substantially at the initial position, and rotate the No. 2 joint 90° clockwise from the initial position. Rotate the No. 1 joint 90°, make the probe mounting portion horizontal, bring the probe into contact with the ball a from the left side, and measure the ball a at one point at the arm position 33." The user operates the measuring arm 2 to measure the space coordinate of the ball a at one point at the arm position F (arm position 33) according to the guide displayed on the display 17.

Figure 15:
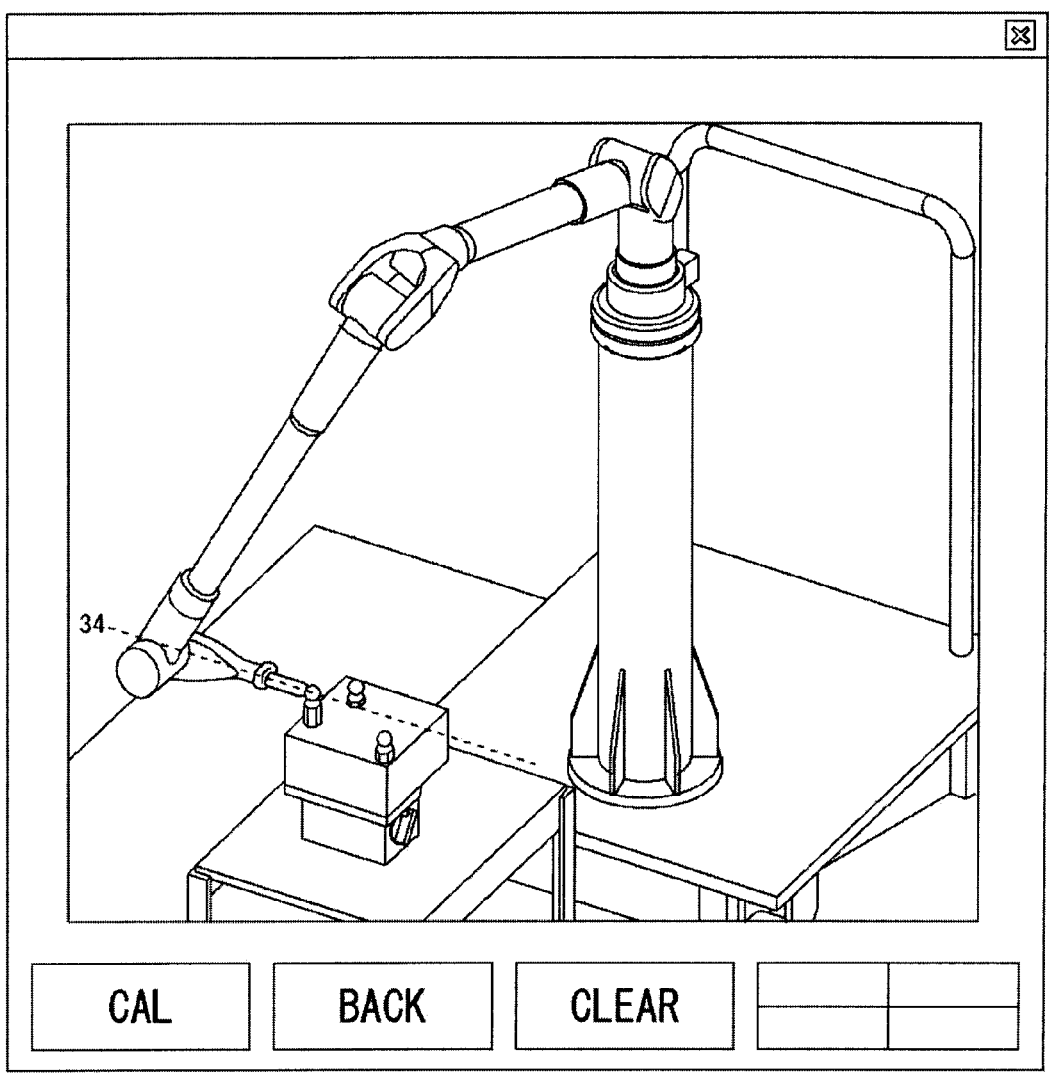
FIG. 15 shows an example of a guide screen in measurement of the reference portion (ball a) at an arm position G.

Then, the display 17 of the computer 16 displays a guide screen in which the measuring arm 2 is operated to measure a space coordinate of the ball a at a predetermined arm position G as shown in FIG. 15. At this time, the display 17 may also display guide text saying, for example, "Rotate the No. 2 joint 180° from the arm position 33. Set the No. 4 joint substantially to the initial position, and rotate the No. 1 joint 90°. Make the probe mounting portion horizontal, bring the probe into contact with the ball a from the left side, and measure the ball a at one point at the arm position 34." The user operates the measuring arm 2 to measure the space coordinate of the ball a at one point at the arm position G (arm position 34) according to the guide displayed on the display 17.

Figure 16:
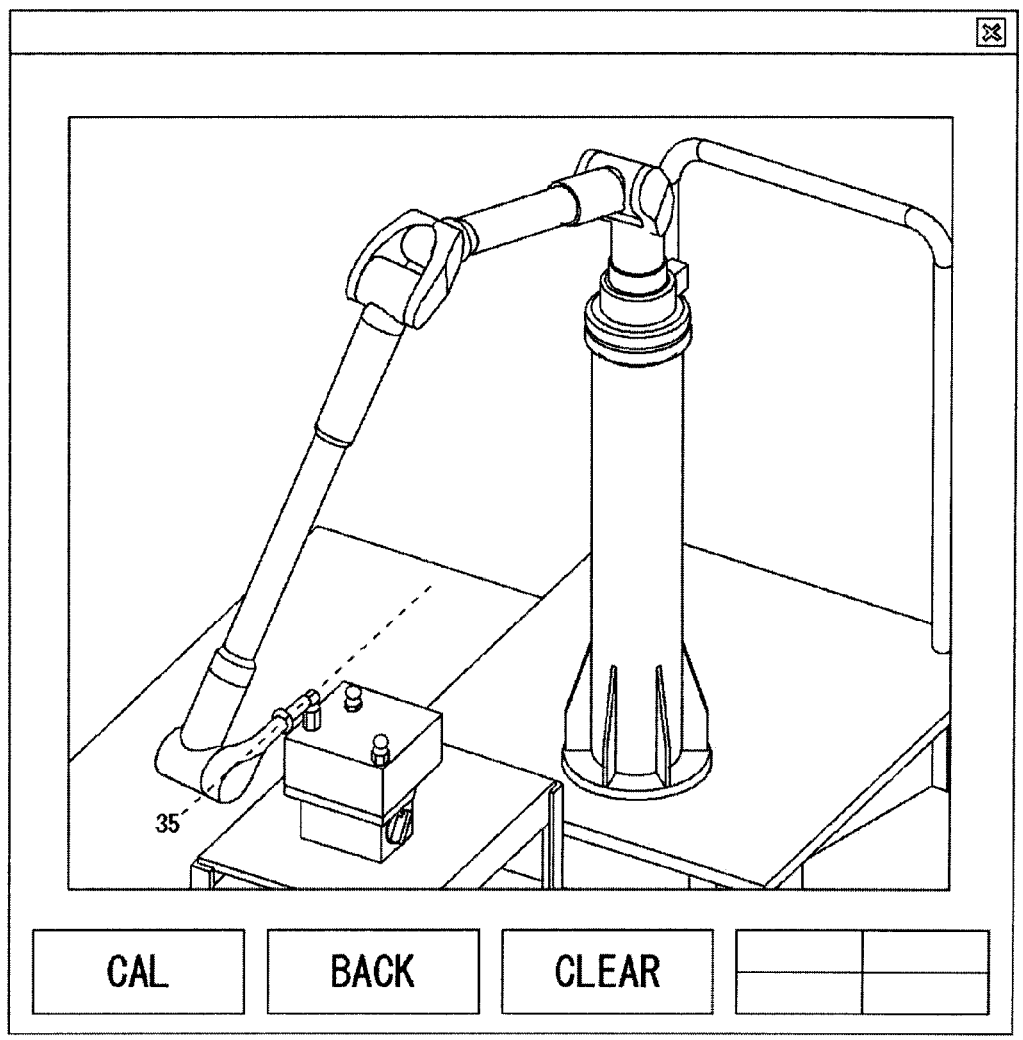
FIG. 16 shows an example of a guide screen in measurement of the reference portion (ball a) at an arm position H.

Then, the display 17 of the computer 16 displays a guide screen in which the measuring arm 2 is operated to measure a space coordinate of the ball a at a predetermined arm position H as shown in FIG. 16. At this time, the display 17 may also display guide text saying, for example, "Set the No. 2 joint and the No. 4 joint substantially to the initial positions, and rotate the No. 1 joint 90°. Make the probe mounting portion horizontal, bring the probe into contact with the ball a from the side opposite to the measuring apparatus, and measure the ball a at one point at the arm position 35." The user operates the measuring arm 2 to measure the space coordinate of the ball a at one point at the arm position H (arm position 35) according to the guide displayed on the display 17.

Figure 17:
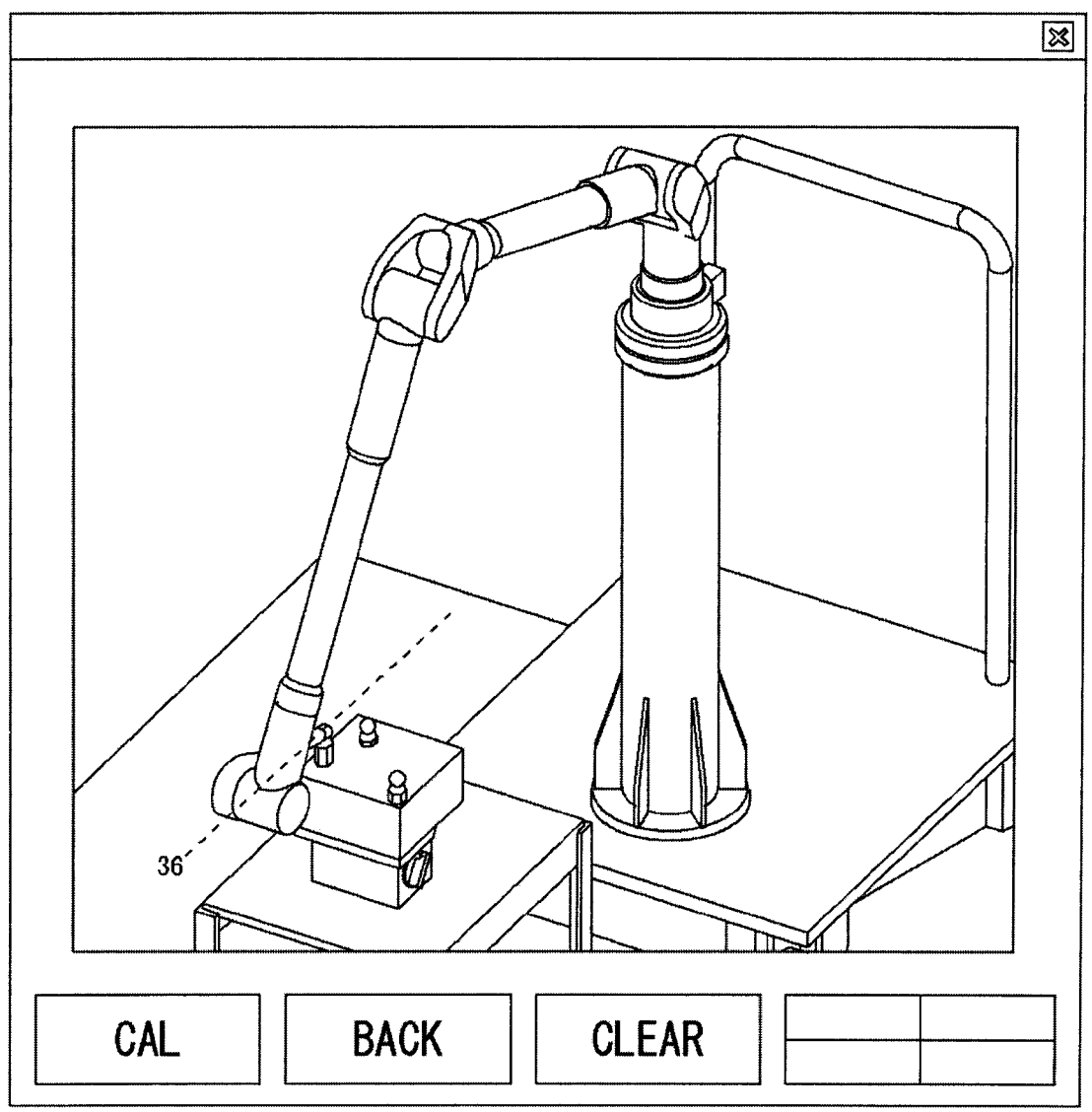
FIG. 17 shows an example of a guide screen in measurement of the reference portion (ball a) at an arm position I.

Then, the display 17 of the computer 16 displays a guide screen in which the measuring arm 2 is operated to measure a space coordinate of the ball a at a predetermined arm position I as shown in FIG. 17. At this time, the display 17 may also display guide text saying, for example, "Rotate the No. 2 joint 180° from the arm positions 35. Set the No. 4 joint substantially to the initial position, and rotate the No. 1 joint 90°. Make the probe mounting portion horizontal, bring the probe into contact with the ball a from the side opposite to the measuring apparatus, and measure the ball a at one point at the arm position 36." The user operates the measuring arm 2 to measure the space coordinate of the ball a at one point at the arm position I (arm position 36) according to the guide displayed on the display 17.

Figure 18:
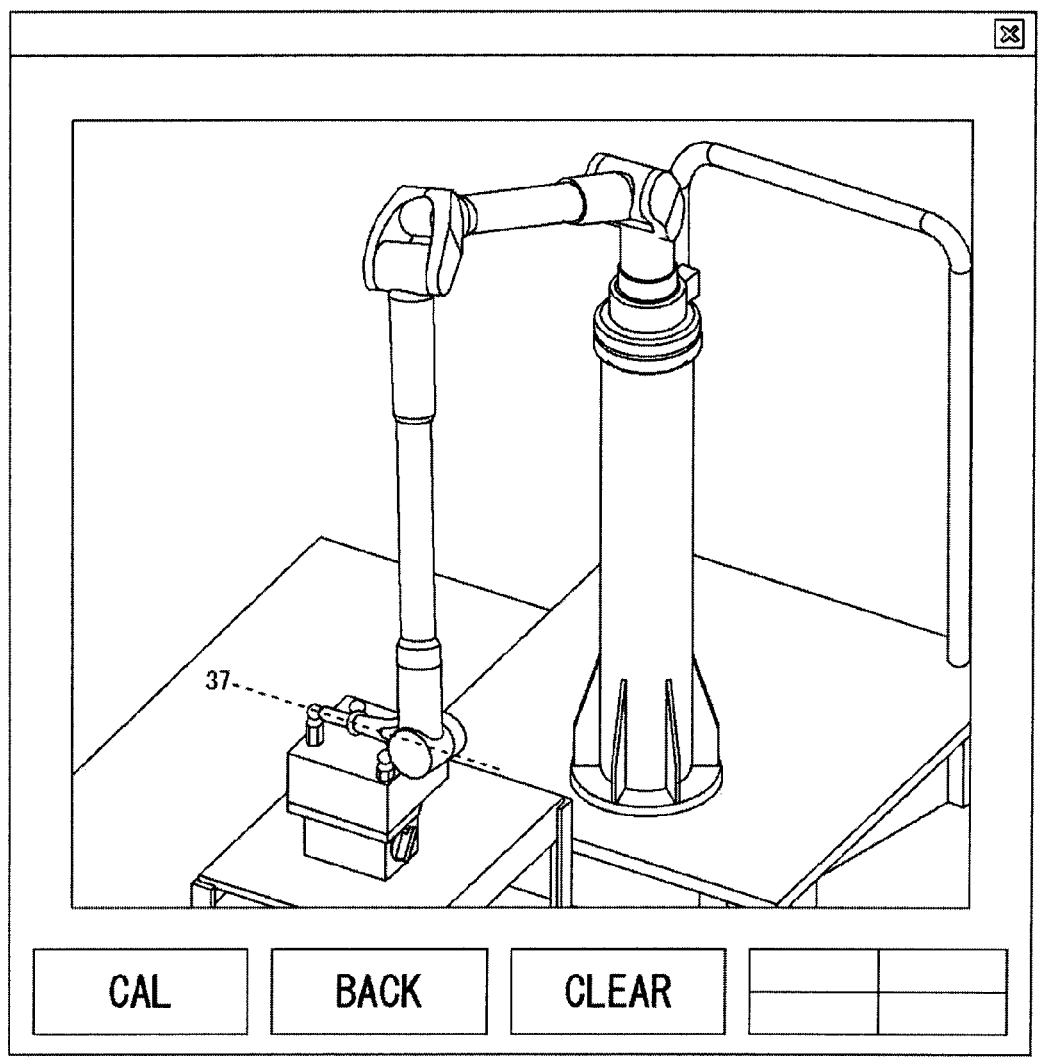
FIG. 18 shows an example of a guide screen in measurement of the reference portion (ball a) at an arm position J.

Then, the display 17 of the computer 16 displays a guide screen in which the measuring arm 2 is operated to measure a space coordinate of the ball a at a predetermined arm position J as shown in FIG. 18. At this time, the display 17 may also display guide text saying, for example, "Confirm that the No. 4 joint is substantially at the initial position, and rotate the No. 2 joint 90° counterclockwise from the initial position. Rotate the No. 1 joint 90°, make the probe mounting portion horizontal, bring the probe into contact with the ball a from the right side, and measure the ball a at one point at the arm position 37." The user operates the measuring arm 2 to measure the space coordinate of the ball a at one point at the arm position J (arm position 37) according to the guide displayed on the display 17.

Figure 19:
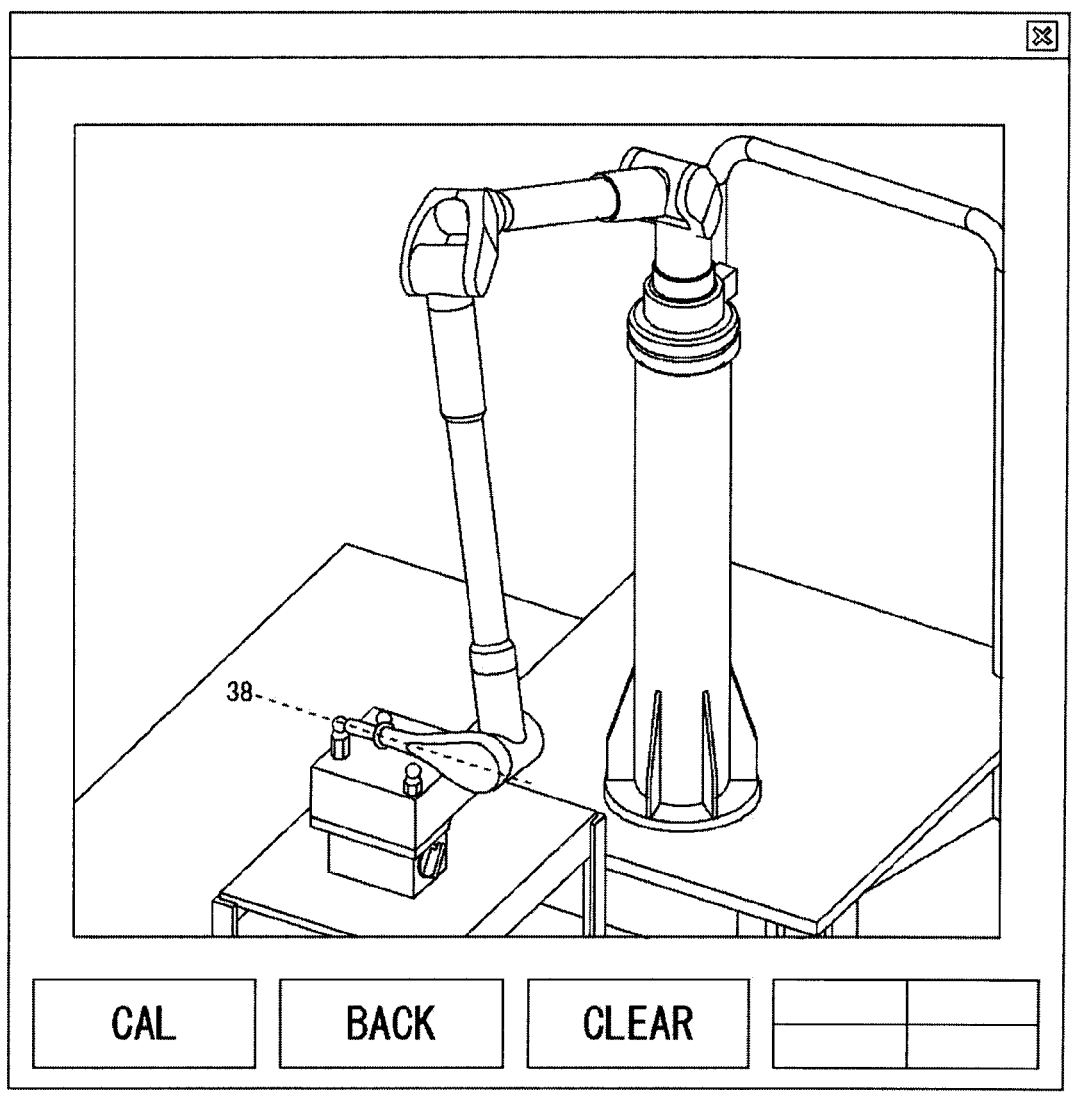
FIG. 19 shows an example of a guide screen in measurement of the reference portion (ball a) at an arm position K.

Then, the display 17 of the computer 16 displays a guide screen in which the measuring arm 2 is operated to measure a space coordinate of the ball a at a predetermined arm position K as shown in FIG. 19. At this time, the display 17 may also display guide text saying, for example, "Rotate the No. 2 joint 180° from the arm position 37. Set the No. 4 joint substantially to the initial position, and rotate the No. 1 joint 90°. Make the probe mounting portion horizontal, bring the probe into contact with the ball a from the right side, and measure the ball a at one point at the arm position 38." The user operates the measuring arm 2 to measure the space coordinate of the ball a at one point at the arm position K (arm position 38) according to the guide displayed on the display 17.

Figure 20:
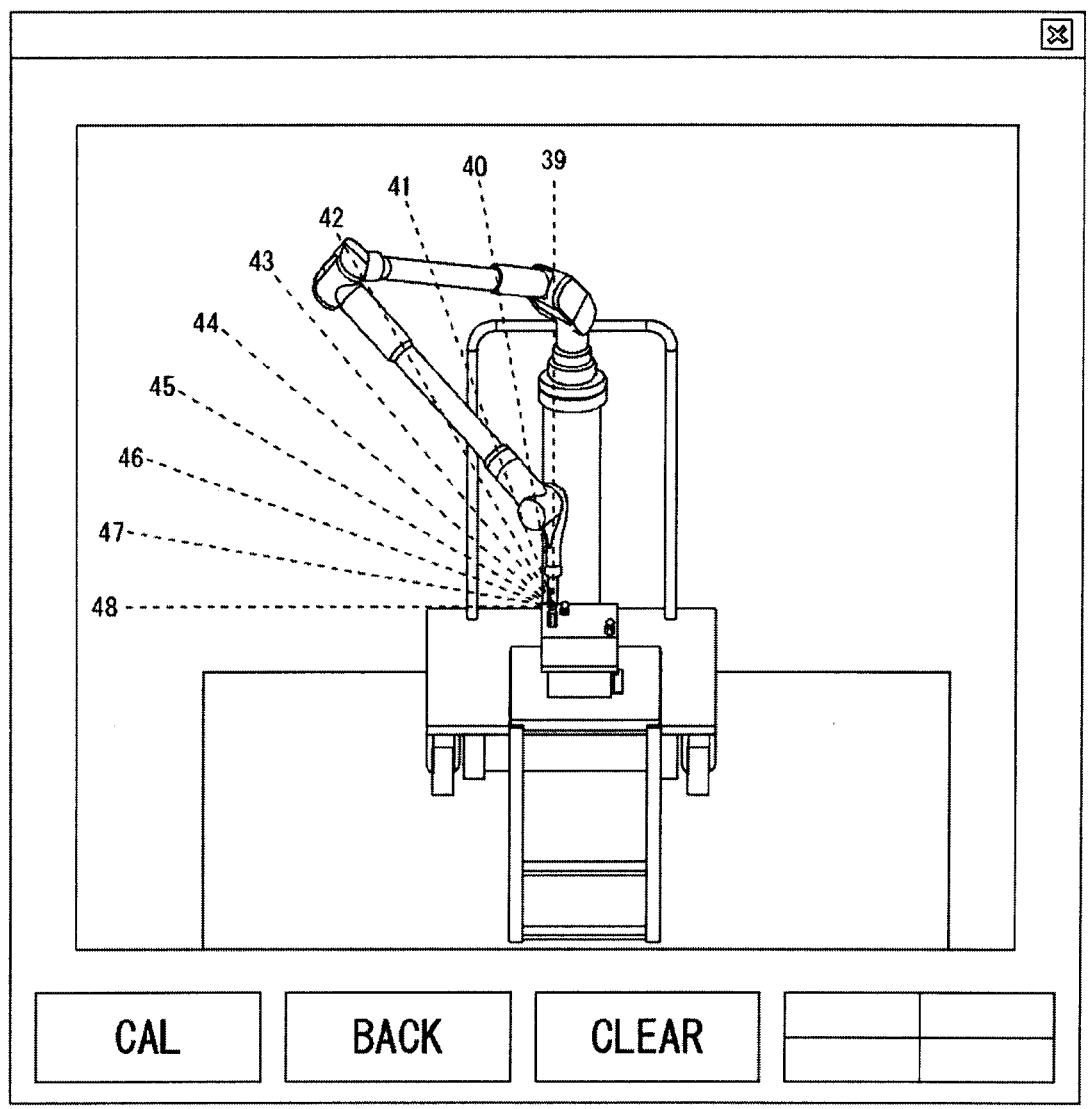
FIG. 20 shows an example of a guide screen in measurement of the reference portion (ball a) at an arm position L.

Then, the display 17 of the computer 16 displays a guide screen in which the measuring arm 2 is operated to measure a space coordinate of the ball a at a predetermined arm position L as shown in FIG. 20. At this time, the display 17 may also display guide text saying, for example, "Rotate the No. 4 joint from the arm position 1, and while tilting the first link and the second link to the left side, measure the ball a at ten points at the arm positions 39 to 48 at regular intervals. The first link becomes substantially horizontal at the arm position 48. At this time, note that the probe mounting portion is always vertically maintained." The user operates the measuring arm 2 to measure the space coordinate of the ball a at ten points at the arm position L (arm positions 39 to 48) according to the guide displayed on the display 17.

Figure 21:
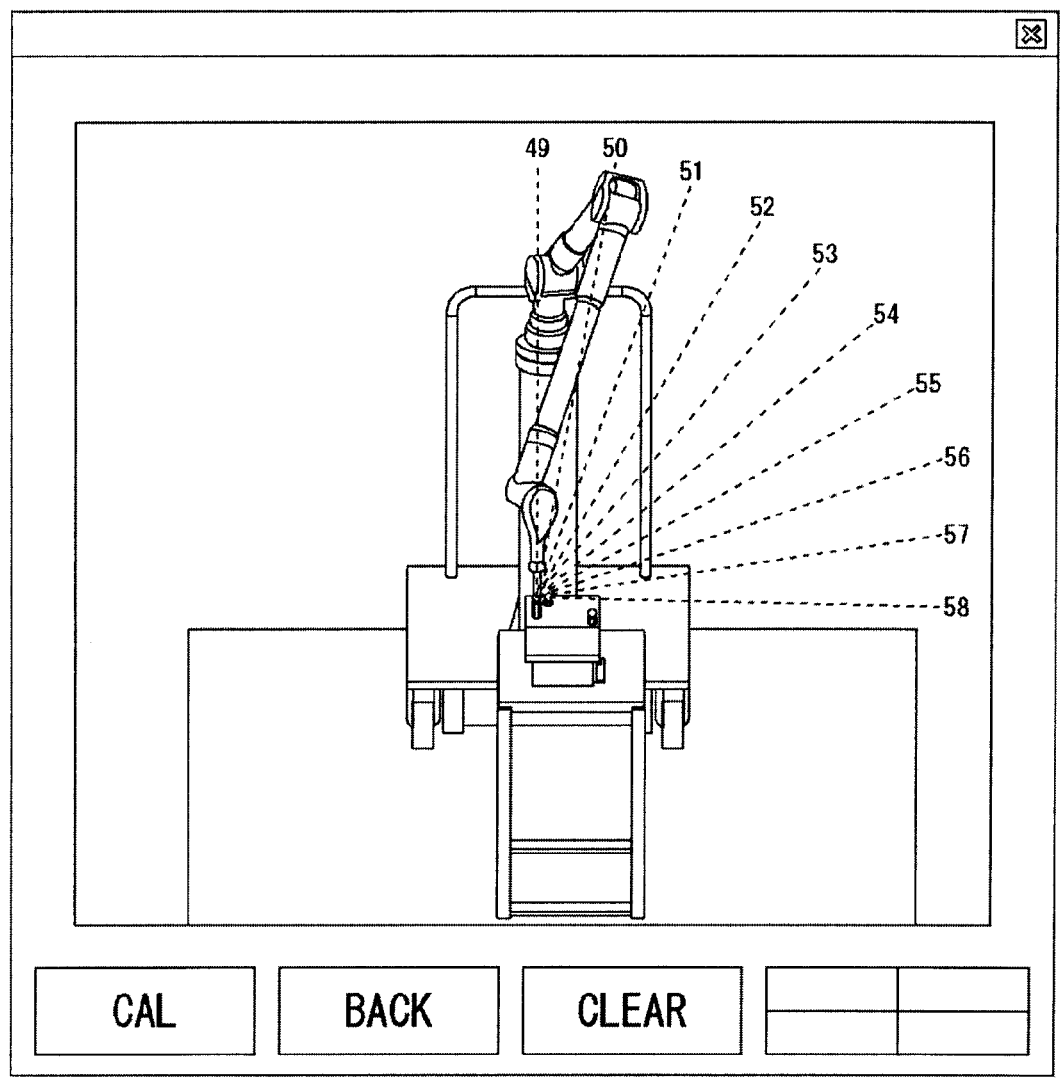
FIG. 21 shows an example of a guide screen in measurement of the reference portion (ball a) at an arm position M.

Then, the display 17 of the computer 16 displays a guide screen in which the measuring arm 2 is operated to measure a space coordinate of the ball a at a predetermined arm position M as shown in FIG. 21. At this time, the display 17 may also display guide text saying, for example, "Rotate the No. 4 joint from the arm positions 1, and while tilting the first link and the second link to the right side, measure the ball a at ten points at the arm positions 49 to 58 at regular intervals. The first link becomes substantially horizontal at the arm position 58. At this time, note that the probe mounting portion is always vertically maintained." The user operates the measuring arm 2 to measure the space coordinate of the ball a at ten points at the arm position M (arm positions 49 to 58) according to the guide displayed on the display 17.

The measurement of the space coordinates of the ball a is thus finished. Next, a space coordinate of the ball b is measured at a plurality of arm positions.

First, the display 17 of the computer 16 displays a guide in which a space coordinate of the ball b is measured at arm positions A' and B' (arm positions 1' to 20') like the above-described arm positions A and B (see FIGS. 9 and 10). The user measures the space coordinate of the ball b at the arm positions A' and B' (arm positions 1' to 20') according to the guide displayed on the display 17.

Figure 22:
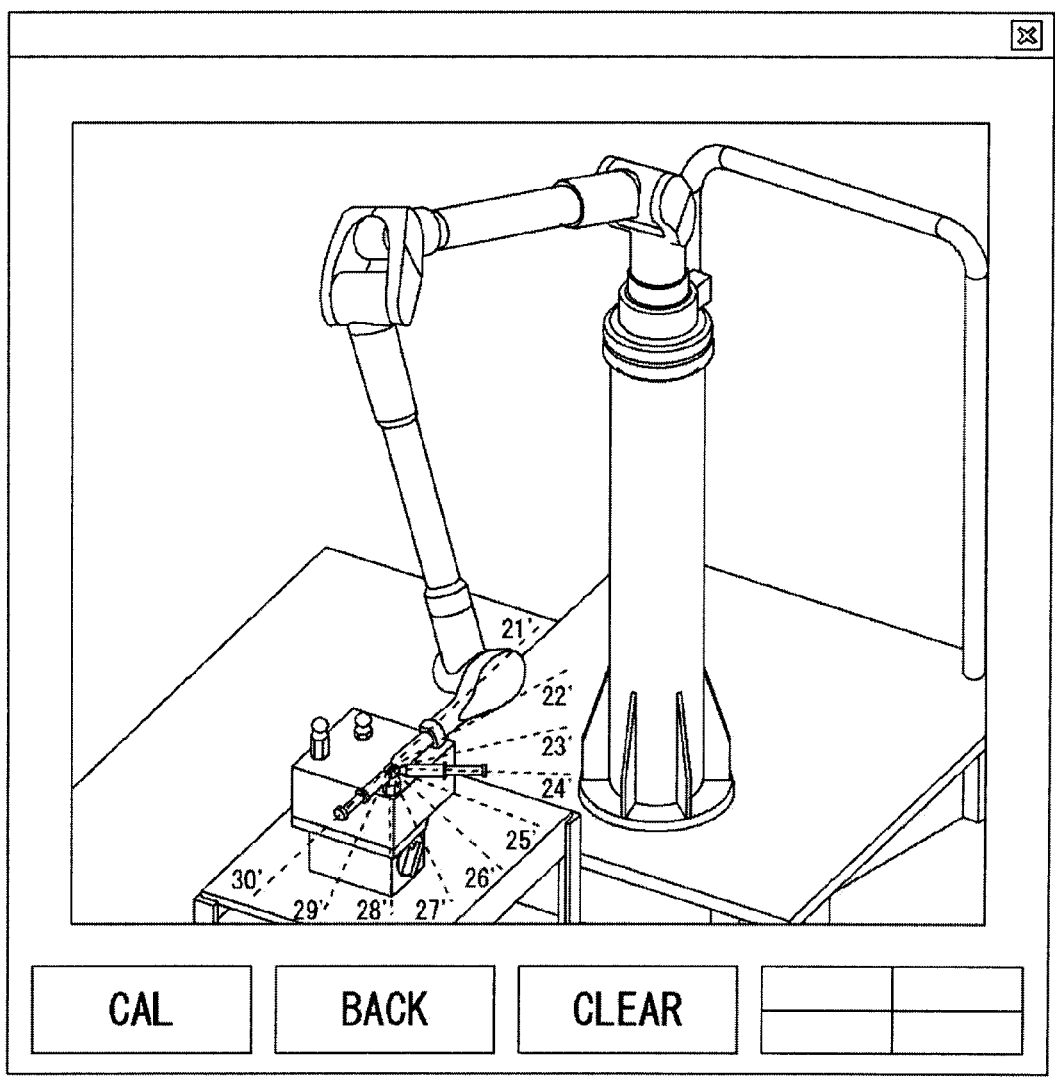
FIG. 22 shows an example of a guide screen in measurement of a reference portion (ball b) at an arm position C'.

Then, the display 17 of the computer 16 displays a guide screen in which the measuring arm 2 is operated to measure a space coordinate of the ball b at a predetermined arm position C' as shown in FIG. 22. At this time, the display 17 may also display guide text saying, for example, "Confirm that the No. 2 joint and No. 4 joint are substantially at the initial positions, rotate the No. 1 joint 90°, make the probe mounting portion horizontal, and bring the probe into contact with the ball b from the measuring apparatus side. While rotating the No. 2 joint 180° and laterally rotating the probe mounting portion, measure the ball b at ten points at arm positions 21' to 30' at regular intervals. Note that the probe is horizontally brought into contact from the side opposite to the measuring apparatus at the arm positions 30'." The user operates the measuring arm 2 to measure the space coordinate of the ball b at ten points at the arm positions C' (arm positions 21' to 30') according to the guide displayed on the display 17.

Then, the display 17 of the computer 16 displays a guide in which a space coordinate of the ball b is measured at arm positions D' to M' (arm positions 31' to 58') like the above-described arm positions D to M (see FIGS. 12 to 21). The user measures the space coordinate of the ball b at the arm positions D' to M' (arm positions 31' to 58') according to the guide displayed on the display 17.

The measurement of the space coordinates of the ball b is thus finished.

Finally, the display 17 of the computer 16 displays a guide screen (not shown) in which a parameter calibration process of the primary calibration parameters is executed by the dedicated processor 15 based on the measurement results of the balls a and b of the standard unit 20A. At this time, the display 17 may also display guide text saying, for example, "When the CAL button is clicked, calculation is started. When the dialogue is closed without clicking the CAL button, measurement is started over." The user clicks the CAL button, and causes the dedicated processor 15 to execute the parameter calibration process of the primary calibration parameters according to the guide displayed on the display 17.

(Calibration of Secondary Calibration Parameter)

Next, an operation will be described for performing calibration of the secondary calibration parameters of the measuring arm 2 in the articulated coordinate measuring apparatus 1 of this embodiment. A case of performing parameter calibration using the standard unit 20C in FIG. 6 is exemplified.

When a guide program for calibration of the secondary calibration parameters is executed, first, the display 17 of the computer 16 displays a guide screen (not shown) in which the standard unit 20C is placed in a predetermined position in an operation space of the measuring arm 2. At this time, the display 17 may also display guide text saying, for example, "Place the standard unit on the surface plate. Place the standard unit in front of the measuring apparatus." The user places the standard unit 20C in the predetermined position in the operation space of the measuring arm 2 according to the guide displayed on the display 17.

Then, the display 17 of the computer 16 displays a guide in which a space coordinate of a ball are measured at arm positions A" to C", L" and M" (arm positions 1" to 30", 39" to 48" and 48" to 58") like the above-described arm positions A to C, L and M (see FIGS. 9 to 11, 20 and 21). The user measures the space coordinate of the ball at the arm positions A" to C", L" and M" (arm positions 1" to 30", 39" to 48" and 48" to 58") according to the guide displayed on the display 17.

Finally, the display 17 of the computer 16 displays a guide screen (not shown) in which a parameter calibration process of the secondary calibration parameters is executed by the dedicated processor 15 based on the measurement results of the ball of the standard unit 20C. At this time, the display 17 may also display guide text saying, for example, "When the CAL button is clicked, calculation is started. When the dialogue is closed without clicking the CAL button, measurement is started over." The user clicks the CAL button, and causes the dedicated processor 15 to execute the parameter calibration process of the secondary calibration parameters according to the guide displayed on the display 17.

According to the parameter calibration method of the articulated coordinate measuring apparatus 1 according to this embodiment, labor and time for calibration work of the parameters of the measuring arm 2 can be reduced. Also, parameter calibration weighted according to changes with time can be performed in view of the characteristics of the parameters of the measuring arm 2.

Specifically, in this embodiment, in the parameter calibration of the measuring arm 2, a parameter calibration process is first performed of the parameters (primary calibration parameters), among all the parameters (a group of parameters) to be calibrated, having such a characteristic that parameter errors increase more than a predetermined reference when a predetermined period passes, and a parameter calibration process is then performed of the parameters (secondary calibration parameters), among the primary calibration parameters, having such a characteristic that parameter errors increase more than a predetermined reference when a shorter period than the predetermined period passes. Thus, the calibration processes of only the parameters (primary calibration parameters and secondary calibration parameters) that change with time need to be performed, and there is no need for performing calibration processes of all the parameters. Thus, for a user who performs parameter calibration work daily (for example, every day, every week, or every month), labor and time for the calibration work of the parameters of the measuring arm 2 can be reduced.

In this case, for the secondary calibration parameters that greatly change with time (for example, parameters having large daily errors), one time parameter calibration as conventional is sometimes insufficient. In this case, parameter calibration of such parameters is performed again. Thus, calibration is performed focusing on parameters that require calibration, thereby allowing efficient parameter calibration. Specifically, parameter calibration weighted according to changes with time can be performed in view of the characteristic of each parameter. In this case, the number of secondary calibration reference portions measured in the secondary calibration is smaller than that of the primary calibration reference portions measured in the primary calibration, and the number of the arm positions in measurement of the secondary calibration reference portions is smaller than that of the arm positions in measurement of the primary calibration reference portions. Thus, secondary calibration work is easier than primary calibration work, and thus requires less labor and time than the primary calibration work.

In this embodiment, the arm position A (arm positions A' and A") and the arm position B (arm positions B' and B") correspond to the parameters of the No. 1 joint 7 of the measuring arm 2. The No. 1 joint 7 of the measuring arm 2 is often subjected to stress in measurement or the like, and parameters of a rotation angle of the No. 1 joint 7 greatly change with time (for example, parameters having large daily errors). Calibration can be performed focusing on such parameters to minimize parameter errors.

In this embodiment, the arm position C (arm positions C' and C") corresponds to the parameters of the No. 1 joint 7 and the No. 2 joint 8 of the measuring arm 2. The No. 1 joint 7 and the No. 2 joint 8 of the measuring arm 2 are often subjected to stress in measurement or the like, parameters of rotation angles of the No. 1 joint 7 and the No. 2 joint 8 greatly change with time (for example, parameters having large daily errors). Calibration can be performed focusing on such parameters to minimize parameter errors.

In this embodiment, the arm position L (arm positions L' and L") and the arm position M (arm positions M' and M") correspond to the parameters of the No. 4 joint 10, the No. 5 joint 11, and the No. 6 joint 12 of the measuring arm 2. The No. 4 joint 10, the No. 5 joint 11, and the No. 6 joint 12 of the measuring arm 2 are often subjected to stress in measurement or the like, and parameters of rotation angles of the No. 4 joint 10, the No. 5 joint 11, and the No. 6 joint 12 greatly change with time (for example, parameters having large daily errors). Calibration can be performed focusing on such parameters to minimize parameter errors.

In this embodiment, in the dedicated processor 15 that performs the parameter calibration process, the coordinate transformation vector that converts the coordinate system of the measuring arm 2 into the coordinate system of the standard unit is used, and the least squares method using the design matrix is used. This allows estimation of a correct parameter value (parameter value after calibration) of the measuring arm 2.

In this embodiment, the computer 16 executes the guide program. The user advances the calibration work according to the guides displayed on the display 17 of the computer 16, and thus can easily perform the above-described parameter calibration method. This can reduce labor and time for calibration work of the parameters of the measuring arm 2.

The embodiment of the present invention has been described by way of example, but the scope of the present invention is not limited to this, and changes and modifications may be made according to purposes within the scope of claims.

For example, in the above descriptions, the calibration process of the primary calibration parameters and the calibration process of the secondary calibration parameters are performed at one time, but the calibration process of the primary calibration parameters may be monthly or weekly performed, and the calibration process of the secondary calibration parameters may be daily performed.

The preferred embodiment of the present invention conceivable at the current time has been described, but it is to be understood that various modifications may be made to this embodiment, and appended claims cover all such modifications within the true spirit and scope of the present invention.

INDUSTRIAL APPLICABILITY

As described above, the parameter calibration method of an articulated coordinate measuring apparatus according to the present invention can reduce labor and time for calibration work of the parameters of the measuring arm, and is used for daily parameter calibration work and useful.

The invention claimed is:

1. A method of calibrating a group of parameters in an articulated coordinate measuring apparatus, the group of parameters including primary calibration parameters and secondary calibration parameters, wherein an articulated measuring arm of the apparatus is operated and a probe mounted to one end of said measuring arm is brought into contact with a measurement point on an object to be measured in order to measure a space coordinate of said measurement point, the method comprising:

placing a primary standard unit having a plurality of primary calibration reference portions in an operation space of said measuring arm;

operating said measuring arm to bring said probe into contact with each of said plurality of primary calibration reference portions in order to measure a space coordinate of each primary calibration reference portion at a plurality of arm positions, said plurality of arm positions corresponding to said primary calibration parameters, said primary calibration parameters being parameters in which parameter errors increase more than a predetermined reference when a predetermined time period passes;

performing a parameter calibration process of said primary calibration parameters based on measurement results of said plurality of primary calibration reference portions;

placing a secondary standard unit having a secondary calibration reference portion smaller in number than said plurality of primary calibration reference portions in the operation space of said measuring arm;

operating said measuring arm to bring said probe into contact with said secondary calibration reference portion in order to measure a space coordinate of said secondary calibration reference portion at a smaller number of arm positions than said plurality of arm positions, said smaller number of arm positions corresponding to said secondary calibration parameters, said secondary calibration parameters being parameters in which parameter errors increase more than a predetermined reference when a shorter time period than said predetermined time period passes; and performing a parameter calibration process of said secondary calibration parameters based on measurement results of said secondary calibration reference portion.

2. The method according to claim 1, wherein said articulated measuring arm comprises a probe mounting member having one end to which said probe is mounted, a first link connected to said probe mounting member, a first joint that provides a bending operation of said probe mounting member with respect to said first link, and a second joint that provides a twisting operation of said probe mounting member with respect to said first link, and the method comprises measuring, when said second joint is rotated in a twisting direction to twist said first link with said probe being brought into contact with said primary calibration reference portions or said secondary calibration reference portion in a state where said probe mounting portion is vertically placed, space coordinates of said primary calibration reference portions or said secondary calibration reference portion at a plurality of arm positions.

3. The method according to claim 1, wherein said articulated measuring arm comprises a probe mounting member having one end to which said probe is mounted, a first link connected to said probe mounting member, a first joint that provides a bending operation of said probe mounting member with respect to said first link, and a second joint that provides a twisting operation of said probe mounting member with respect to said first link, and the method comprises measuring, when said first joint is rotated in a bending direction to rotate said probe mounting member along a vertical plane with said probe being brought into contact with said primary calibration reference portions or said secondary calibration reference portion from a state where said probe mounting portion is horizontally placed, space coordinates of said primary calibration reference portions or said secondary calibration reference portion at a plurality of arm positions.

4. The method according to claim 1, wherein said articulated measuring arm comprises a probe mounting member having one end to which said probe is mounted, a first link connected to said probe mounting member, a first joint that provides a bending operation of said probe mounting member with respect to said first link, and a second joint that provides a twisting operation of said probe mounting member with respect to said first link, and the method comprises measuring, when said second joint is rotated in a twisting direction to rotate said probe mounting member along a horizontal plane with said probe being brought into contact with said primary calibration reference portions or said secondary calibration reference portion from a state where said probe mounting portion is horizontally placed, space coordinates of said primary calibration reference portions or said secondary calibration reference portion at a plurality of arm positions.

5. The method according to claim 1, wherein said articulated measuring arm comprises a probe mounting member having one end to which said probe is mounted, a first link connected to said probe mounting member, a second link connected to said first link and mounted to a support member, a fourth joint that provides a twisting operation of said first link with respect to said second link, a fifth joint that provides a bending operation of said second link with respect to said support member, and a sixth joint that provides a twisting operation of said second link with respect to said support member, and the method comprises measuring, when said fourth joint and said sixth joint are rotated in a twisting direction to horizontally tilt said first link with said probe being brought into contact with said primary calibration reference portions or said secondary calibration reference portion in a state where said probe mounting portion is vertically placed, space coordinates of said primary calibration reference portions or said secondary calibration reference portion at a plurality of arm positions.

6. The method according to claim 1, Wherein said parameter calibration process performs a parameter estimation process by a least squares method using a matrix with a P-matrix and an R-matrix as a design matrix, wherein said P-matrix includes a component of a partial differential value in which a coordinate value obtained by measurement is partially differentiated by said primary calibration parameters or said secondary calibration parameters, and wherein said R-matrix includes a component of a partial differential value in which a coordinate value obtained by measurement is partially differentiated by a vector component of a coordinate transformation vector which converts a coordinate system of the measuring arm into a coordinate system of the standard unit.

7. A non-transient computer readable medium encoded with a guide program which guides a user to perform calibration of a group of parameters in an articulated coordinate measuring apparatus, the group of parameters including primary calibration parameters and secondary calibration parameters, wherein the program causes a computer to execute the steps of:

guiding said user to place a primary standard unit having a plurality of primary calibration reference portions in an operation space of a measuring arm;

guiding said user to operate said measuring arm to bring a probe into contact with each of said primary calibration reference portions in order to measure a space coordinate of each primary calibration reference portion at a plurality of arm positions, said plurality of arm positions corresponding to said primary calibration parameters, said primary calibration parameters being parameters in which parameter errors increase more than a predetermined reference when a predetermined time period passes;

performing a parameter calibration process of said primary calibration parameters based on measurement results of said plurality of primary calibration reference portions;

guiding said user to place a secondary standard unit having a secondary calibration reference portion smaller in number than said plurality of primary calibration reference portions in the operation space of said measuring arm;

guiding said user to operate said measuring arm to bring said probe into contact with said secondary calibration reference portion in order to measure a space coordinate of said secondary calibration reference portion at a smaller number of arm positions than said plurality of arm positions, said smaller number of arm positions corresponding to said secondary calibration parameters, said secondary calibration parameters being parameters in which parameter errors increase more than a predetermined reference when a shorter time period than said predetermined time period passes; and performing a parameter calibration process of said secondary calibration parameters based on measurement results of said secondary calibration reference portion.

* * * * *

UNITED STATES PATENT AND TRADEMARK OFFICE
CERTIFICATE OF CORRECTION

PATENT NO. : 8,468,869 B2
APPLICATION NO. : 12/666877
DATED : June 25, 2013
INVENTOR(S) : Fumikazu Ebara Page 1 of 1

It is certified that error appears in the above-identified patent and that said Letters Patent is hereby corrected as shown below:

In the Claims:

Claim 6, col. 21, line 13, "Wherein" should read as --wherein--.

Signed and Sealed this
Thirteenth Day of August, 2013

Teresa Stanek Rea
*Acting Director of the United States Patent and Trademark Office*